United States Patent
Ishiyama et al.

(10) Patent No.: US 6,305,707 B1
(45) Date of Patent: *Oct. 23, 2001

(54) STRUCTURE FOR PLACEMENT OF HEAD PROTECTING AIR BAG APPARATUS

(75) Inventors: Hiroshi Ishiyama; Yoshiharu Furukawa, both of Toyota; Chiharu Totani, Gifu; Toshinori Tanase, Gifu-ken, all of (JP)

(73) Assignees: Toyota Jidosha Kabushiki Kaisha; Toyoda Gosei Co., Ltd., both of Aichi-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,337

(22) Filed: May 12, 1999

(30) Foreign Application Priority Data

May 12, 1998 (JP) .................................................. 10-128772

(51) Int. Cl.[7] .................................................. B60R 21/16
(52) U.S. Cl. ..................................... 280/728.2; 280/730.2
(58) Field of Search ............................ 280/728.1, 728.2, 280/730.1, 730.2

(56) References Cited

U.S. PATENT DOCUMENTS

| | | |
|---|---|---|
| 5,265,903 | 11/1993 | Kuretake et al. . |
| 5,788,270 | 8/1998 | Haland . |
| 5,791,683 | 8/1998 | Shibata et al. . |
| 5,868,419 | * 2/1999 | Taguchi et al. .................... 280/728.3 |
| 5,924,724 | * 7/1999 | Nakamura et al. ................ 280/730.2 |
| 6,079,732 | * 6/2000 | Nakajima et al. ................. 280/728.2 |
| 6,082,761 | * 7/2000 | Kato et al. ......................... 280/730.2 |

FOREIGN PATENT DOCUMENTS 9-249089    9/1997    (JP) .

* cited by examiner

Primary Examiner—Paul N. Dickson
Assistant Examiner—Faye M. Fleming
(74) Attorney, Agent, or Firm—Pillsbury Winthrop LLP

(57) ABSTRACT

A guide plate 45 is placed at a guiding and holding member 42 which is fixed to a region of an inner panel 34 adjacent to the upper end portion 49A of a B pillar garnish. The guide plate 45 has a base end portion 45A which extends from the vehicle interior side to the vehicle exterior side. The base end portion 45A is fixed to the guiding and holding member 42. The cross sectional configuration of the guide plate 45 when viewed from the vehicle front is formed in a substantial U shape which surrounds the folded air bag body and whose opening portion faces the outer side of the vehicle interior. When the air bag body is expanded, the guide plate 45 is extended as well so as to cover the upper end portion 49A of the center pillar garnish 49. As a result, the air bag body can expand more smoothly, and the displacement of the center pillar garnish from the vehicle body can be prevented.

28 Claims, 22 Drawing Sheets

STRUCTURE FOR PLACEMENT OF HEAD PROTECTING AIR BAG APPARATUS

BACKGROUND OF THE INVENTION

1. Field of the Invention

The present invention relates to a structure for the placement of a head protecting air bag apparatus, and more particularly, to the structure for the placement of an air bag body of a head protecting air bag apparatus in which, at the time when a high load of a predetermined value or greater is applied to a vehicle side portion, gas is ejected from an inflator such that the air bag body expands into a curtain-like form so as to span over to the B pillar along a roof side rail due to the ejected gas. Here, "the air bag body expands so as to span over to the B pillar along the roof side rail" is intended to express a structure in which the air bag body expands from the A pillar or the C pillar to span over to the B pillar along the roof side rail, and also expresses a structure in which the air bag body expands, along the roof guide rail, from the A pillar and passes across the B pillar to extend to the C pillar.

2. Description of the Related Art

In order to improve the protection of the head of a vehicle occupant seated in the front seat when a high load of a predetermined value or greater is applied to a vehicle side portion, there have been proposed head protecting air bag apparatuses in which, an air bag body, which is stored in a folded state along a front pillar portion and a roof side rail portion, is inflated so as to expand into a curtain-like form. The structure of such a head protecting air bag apparatus is disclosed in International Publication No. WO 96/26087, and will be described hereinafter.

As shown in FIG. 16, the head protecting air bag apparatus 100 is mainly comprised of an elongated duct 106 which is disposed so as to extend from a front pillar portion 102 along a roof side rail 104, an air bag body 112 which is stored in the duct 106 in a folded state and which is fixed to the vehicle body at a front end fixing point 108 and a rear end fixing point 110, an inflator 116 which is connected to the rear end portion of the duct 106 by a hose 114 and which ejects gas at the time when a high load of a predetermined value or greater is applied to the vehicle side portion, and a belt-shaped strap 118 whose one end portion is fixed to the vehicle body and whose other end portion is fixed to the rear end portion of the air bag body 112. Further, the air bag body 112 is formed by connecting together a plurality of cells 120, each of which is formed in a substantially cylindrical shape whose longitudinal direction corresponds to the substantially vertical direction of the vehicle.

In accordance with the above-described structure, when a high load of a predetermined value or greater is applied to a vehicle side portion, gas is ejected from the inflator 116. The ejected gas flows into each of the cells 120 of the folded air bag body 112 via the hose 114 and the duct 106. Accordingly, each of the cells 120 is inflated so as to form a substantially cylindrical shape whose longitudinal direction substantially corresponds to the vertical direction of the vehicle. As a result, the air bag body 112 is inflated into a curtain-like form along a window glass 122.

However, in this structure for the placement of the head protecting air bag apparatus, the rear end portion of the air bag body 112 is located to the rear of a B pillar (the center pillar) portion 124 in the longitudinal direction of the vehicle, and is connected to the vehicle body by the strap 118. For this reason, it can be understood that, in some cases, the expanding air bag body 112 contacts the upper end portion of the garnish of the B pillar portion 124, enters into the gap between the garnish of the B pillar portion 124 and the vehicle body, and disturbs the expansion of the air bag body 112, thereby causing the garnish of the B pillar portion 124 to be displaced from the vehicle body.

SUMMARY OF THE INVENTION

In view of the aforementioned, it is an object of the present invention to provide a structure for the placement of a head protecting air bag apparatus which expands the air bag body more smoothly and which prevents the displacement of the B pillar garnish from the vehicle body.

In accordance with the first aspect of the present invention, there is provided a structure for the placement of a head protecting air bag apparatus whose one end portion is connected to an inflator and which expands into a curtain-like form so as to span over to a B pillar along a roof side rail, comprising: an air bag body expanding direction regulating member whose base end portion is fixed to a region of the roof side rail adjacent to the upper end portion of a B pillar garnish, and which is located at the vehicle interior side of the folded air bag body, and whose extending portion at the edge portion side thereof extends toward a position at which the extending portion covers the upper end portion of the B pillar garnish at the time of expansion of the air bag body.

At the time of expansion of the air bag body, due to the inflation pressure of the air bag body, the extending portion of the air bag body expanding direction regulating member, which is located at the vehicle interior side of the folded air bag body, covers the upper end portion of the B pillar garnish before the expansion of the air bag body. Therefore, the air bag body in the course of expansion thereof is prevented from tightly contacting the upper end portion of the B pillar garnish and entering into the gap between the B pillar garnish and the vehicle body. As a result, the air bag body can be expanded more smoothly, and the displacement of the B pillar garnish from the vehicle body can be prevented.

At the time of a vehicle side collision, even in the case in which the upper end portion of the B pillar garnish is displaced from the vehicle body and is lifted up toward the vehicle interior, since the extending portion at the edge portion side of the air bag body expanding direction regulating member covers the upper end portion of the B pillar garnish before the expansion of the air bag body, the air bag body in the course of expansion thereof is prevented from tightly contacting the upper end portion of the B pillar garnish and entering into the gap between the B pillar garnish and the vehicle body, the air bag body can be expanded more smoothly, and the displacement of the B pillar garnish from the vehicle body can be prevented.

In accordance with the second aspect of the present invention, there is provided a structure for the placement of a head protecting air bag apparatus whose one end portion is connected to an inflator and which expands into a curtain-like form so as to span over to a B pillar along a roof side rail, wherein an air bag body expanding direction regulating member whose base end portion is fixed to a region of the roof side rail adjacent to the upper end portion of a B pillar garnish and which is located at the vehicle interior side of the folded air bag body, and whose extending portion at the edge portion side thereof extends toward a position at which the extending portion covers the upper end portion of the B pillar garnish at the time of expansion of the air bag body is a plate whose cross-section is formed in a substantial U-shape, at least one of: (i) a plurality of parallel concave grooves formed in an inner wall surface of the plate and running along the vehicle longitudinal direction; and (ii) at least one oblique concave groove which, when the plate extends, is directed from an inflator-side end portion of the plate toward a vehicle longitudinal direction intermediate portion of a side opposite the fixed side of the B pillar garnish, being formed in the plate.

In addition to the first aspect of the present invention, since concave grooves are formed on the inner wall surface of the plate serving as an air bag body expanding direction regulating member, in accordance with the expansion of the air bag body, due to the existence of the concave grooves, the plate can easily bend. Namely, because the concave grooves are formed on the inner wall surface of the plate, the load needed to extend the plate is minimized, and the air bag body can be expanded much more smoothly.

In accordance with the third aspect of the present invention, there is provided a structure for the placement of a head protecting air bag apparatus whose one end portion is connected to an inflator and which expands into a curtain-like form so as to span over to a B pillar along a roof side rail, wherein an air bag body expanding direction regulating member whose base end portion is fixed to a region of the roof side rail adjacent to the upper end portion of B pillar garnish, and which is located at the vehicle interior side of the folded air bag body, and whose extending portion at the edge portion side thereof extends toward a position at which the extending portion covers the upper end portion of the B pillar garnish at the time of expansion of the air bag body is a resin plate which is formed from an extrusion molding product having a substantially U-shaped cross section and which is made from soft resin.

More preferably, there is provided a structure for the placement of a head protecting air bag apparatus, wherein the resin plate has a plurality of hollow portions at least at the base portion which extends from the vehicle interior side to the vehicle exterior side.

In addition to the aforementioned effect of the first aspect of the present invention, since the air bag body expanding direction regulating member is an extrusion molded product which is made from soft resin, and has a plurality of hollow portions at least at the base end portion thereof which extends from the vehicle interior side to the vehicle exterior side, at the time of non-expansion of the air bag body, in the case in which the vehicle occupant hits a region where the air bag body expanding direction regulating member is placed, the base end portion which at least extends from the vehicle interior side to the vehicle exterior side of the air bag body expanding direction regulating member easily contracts and deforms from the impact load which is applied from the vehicle interior side to the vehicle exterior side, thereby allowing the impact load to be mitigated. Further, if the air bag body expanding direction regulating member is, for example, metallic, in order to prevent the air bag body from being damaged by the edge of the extending portion at the side end thereof, it is necessary to apply a treatment such as a coating or the like to the edge. Conversely, since the present invention does not need such an edge treatment as described above, the apparatus according to the present invention can be manufactured inexpensively.

In accordance with the fourth aspect of the present invention, there is provided a structure for the placement of a head protecting air bag apparatus according to the third aspect of the present invention, wherein the tip end portion of the resin plate has a protrusion which is able to push a ceiling portion interior member in accordance with the expansion of the air bag body.

In addition to the effect of the third aspect of the present invention, at the time of expansion of the air bag body, pushing pressure, which is applied to the ceiling portion interior member which covers the resin plate, can be transmitted through the protrusion which is formed at the tip end portion of the resin plate via the resin plate. As a result, since pushing pressure from the resin plate is effectively transmitted to the ceiling portion interior member, it is possible to push the ceiling portion interior member toward the vehicle interior and to place the tip end portion of the resin plate on the upper end portion of B pillar garnish.

In accordance with the fifth aspect of the present invention, there is provided a structure for the placement of a head protecting air bag apparatus according to the first aspect of the present invention, wherein the air bag body expanding direction regulating member is a cloth belt.

More preferably, in the structure for the placement of a head protecting air bag apparatus, the cloth belt is fixed by using loop-shaped, long, narrow fixing members which can be broken at the time of expansion of the air bag body.

In addition to the effects of the first aspect of the present invention, at the time of expansion of the air bag body, the loop-shaped, long, narrow fixing members are broken so that the air bag body expanding direction regulating member can easily deform and easily conform to the configuration of the upper end portion of the B pillar garnish. Accordingly, it is ensured that the air bag body expanding direction regulating member covers the upper end portion of the B pillar garnish. Further, because the air bag body expanding direction regulating member is a cloth belt, at the time of expansion of the air bag body, the air bag body expanding direction regulating member is not broken and scattered, and can be assembled simply so that the apparatus can be manufactured inexpensively.

In accordance with the sixth aspect of the present invention, there is provided a structure for the placement of a head protecting air bag apparatus according to the first aspect of the present invention, wherein the air bag body expanding direction regulating member is an annular member which is able to break at the time of expansion of the air bag body.

More preferably, in the structure for the placement of a head protecting air bag apparatus, the annular member is a member for maintaining the folded shape of the air bag body.

In addition to the effect of the first aspect of the present invention, since the annular member for maintaining the folded shape of the air bag body is used as the air bag body expanding direction regulating member, the number of components can be reduced. Further, for the same reason as described above, the air bag apparatus can be made compact, and storability can be improved.

DESCRIPTION OF THE PREFERRED EMBODIMENTS

With reference to FIGS. 1 to 7 and FIGS. 17 to 20, a description of a structure for the placement of a head protecting air bag apparatus according to a first embodiment of the present invention will be given hereinafter.

In these figures, arrow FR indicates the vehicle front direction, arrow UP indicates the vehicle upper direction, and arrow IN indicates the direction toward the inner side in the vehicle transverse direction.

Figure 6:
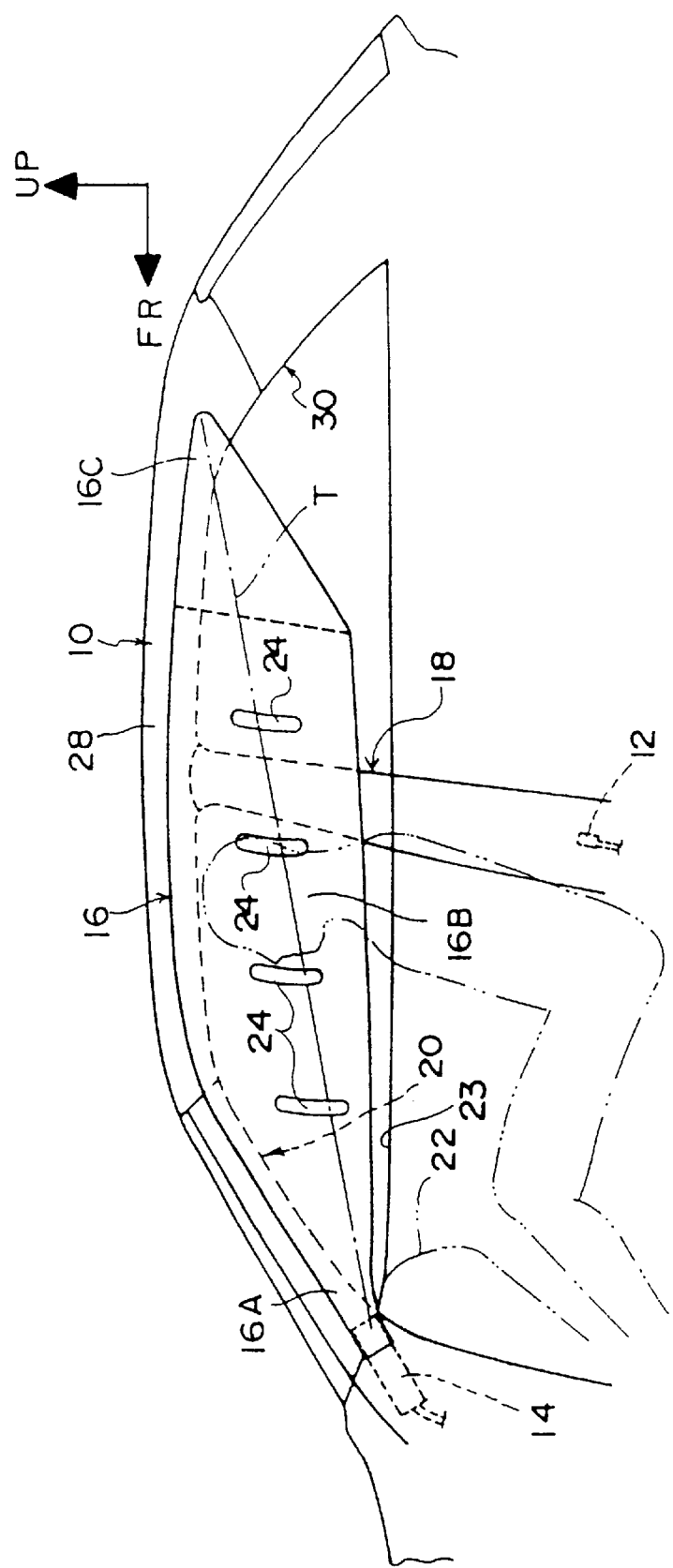
FIG. 6 is a schematic side view illustrating a state where the air bag body is inflated and expanded in the structure for the placement of the head protecting air bag apparatus according to the first embodiment of the present invention.

As shown in FIG. 6, a head protecting air bag apparatus 10 according to the present embodiment is mainly comprised of a sensor 12 for detecting a vehicle side collision, a cylindrical inflator 14 which ejects gas when operated, and an air bag body 16. The sensor 12 is disposed in the vicinity of the lower end portion of a B pillar (center pillar) 18, and detects a side collision when a side collision load, which is greater than or equal to a predetermined value, is applied to the vehicle side portion.

The inflator 14 is disposed in the vicinity of the portion where an A pillar (front pillar) 20 and an instrument panel 22 connect, and is connected to the aforementioned sensor 12. Therefore, when the sensor 12 detects a side collision, the inflator 14 is operated.

At the intermediate portion of the air bag body 16 in the vertical direction thereof when viewed from the side, a plurality of non-inflating portions 24, each of which intersects a tension line T connecting a front end fixing point and a rear end fixing point of the air bag body 16 and whose longitudinal direction corresponds to the vertical direction of the air bag body, are formed so as to be spaced apart from each other at predetermined distances. Accordingly, at the time of expansion of the air bag body, a plurality of cylindrical inflation portions, which are provided substantially parallel to each other and which intersect the tension line T, are formed by these non-inflation portions 24.

A front end portion 16A of the air bag body 16 is disposed such that the gas ejected from the inflator 14 flows into the front end portion 16A. The upper end edge portion of an intermediate portion 16B of the air bag body 16 is disposed along the A pillar 20 and a roof side rail 28. The upper end edge portion of a rear end portion 16C of the air bag body 16 is disposed in the vicinity of a C pillar (quarter pillar) 30.

In FIG. 6, the inflator 14 is disposed at the front end portion 16A of the air bag body 16. However, the inflator 14 can be disposed at the rear end portion 16C of the air bag body 16 such that the gas ejected from the inflator 14 flows into the rear end portion 16C.

Figure 17:
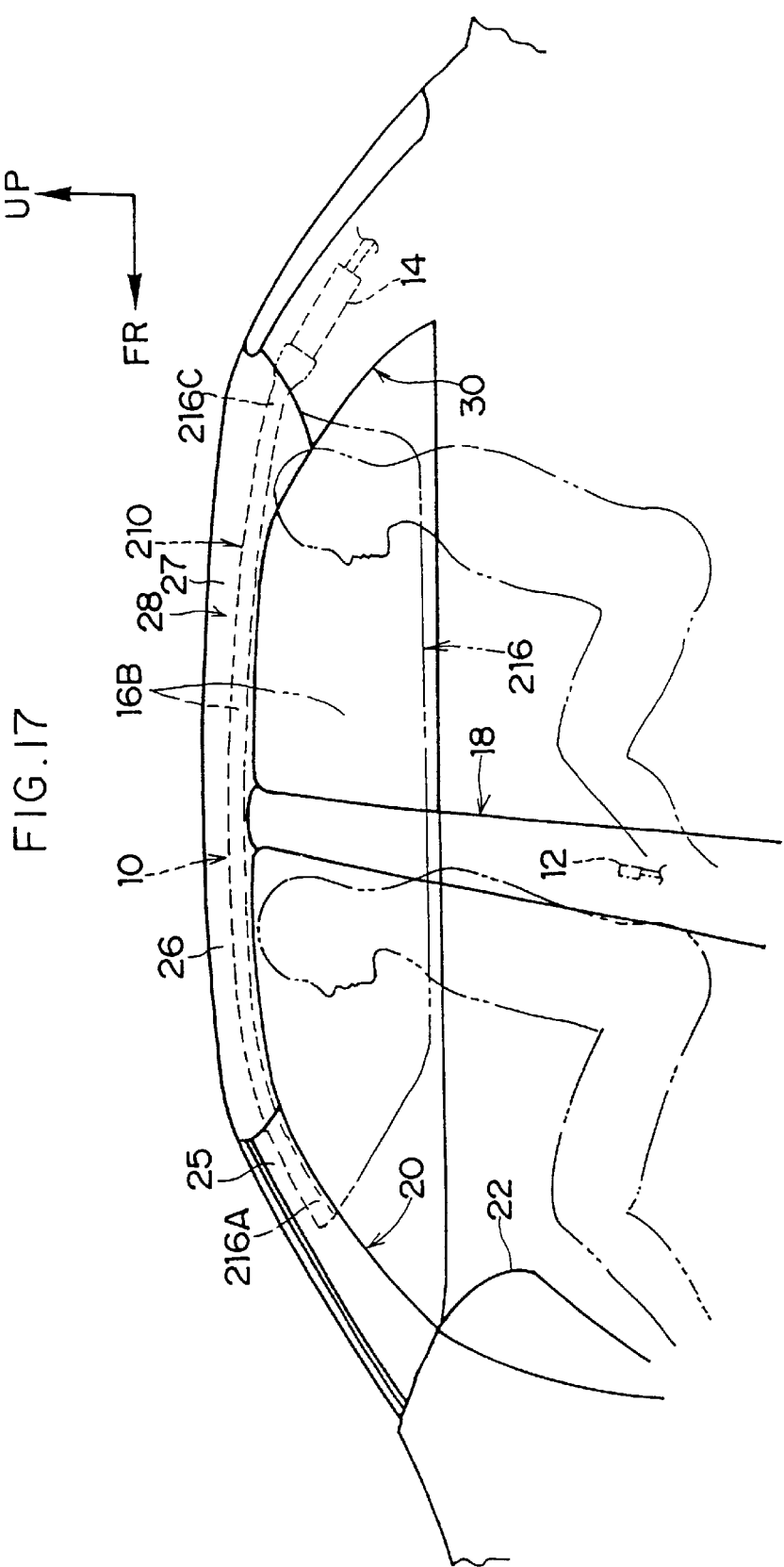
FIG. 17 is a schematic side view illustrating an inflated and expanded state of an air bag body in the structure for the placement of a head protecting air bag apparatus according to the variant example of the first embodiment of the present invention.

Further, as is shown in FIG. 17, the present invention is also applicable to an air bag apparatus 210 for the front and rear seats in which the upper end edge portion of a front end portion 216A of an air bag body 216 is disposed adjacent to the A pillar 20, and a rear end portion 216C of the air bag body 216 is disposed adjacent to the C pillar 30. In this case, the inflator 14 is disposed adjacent to the C pillar 30, and the rear end portion 216C of the air bag body 216 is disposed at the position where the inflator 14 is disposed such that the gas ejected from the inflator 14 flows into the rear end portion 216C.

Figure 7:
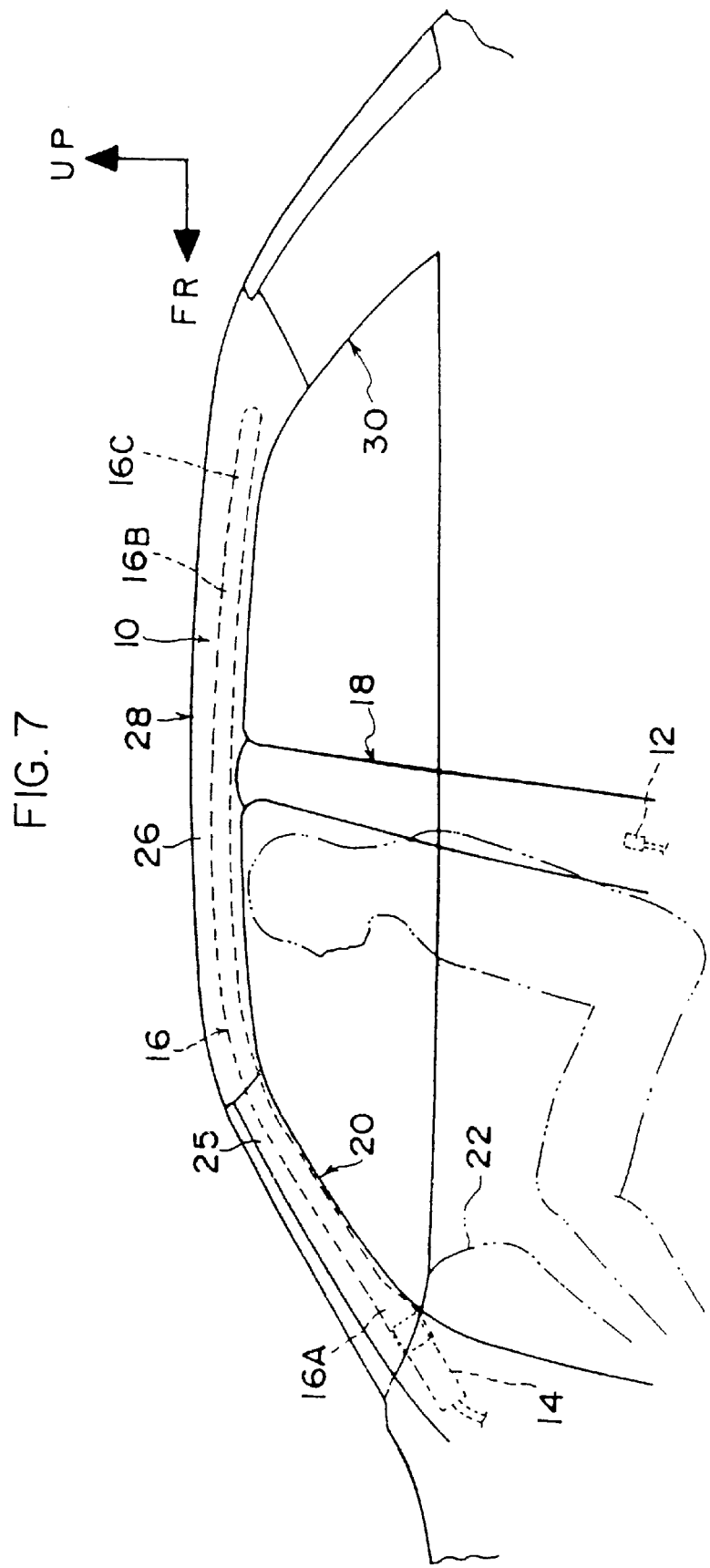
FIG. 7 is a schematic side view illustrating the state where the air bag body is housed in the structure for the placement of the head protecting air bag apparatus according to the first embodiment of the present invention.

As is shown in FIG. 7, the air bag body 16 is folded in an accordion shape in a substantially vertical direction so as to form an elongated shape, and in this state, is stored so as to extend along an A pillar garnish 25 and a roof head lining 26. Further, as is shown in FIG. 17, the air bag body 216 is folded in an accordion shape in a substantially vertical direction so as to form an elongated shape and in this state, is stored so as to extend along the A pillar garnish 25, a C pillar garnish 27, and the roof head lining 26.

Figure 5:
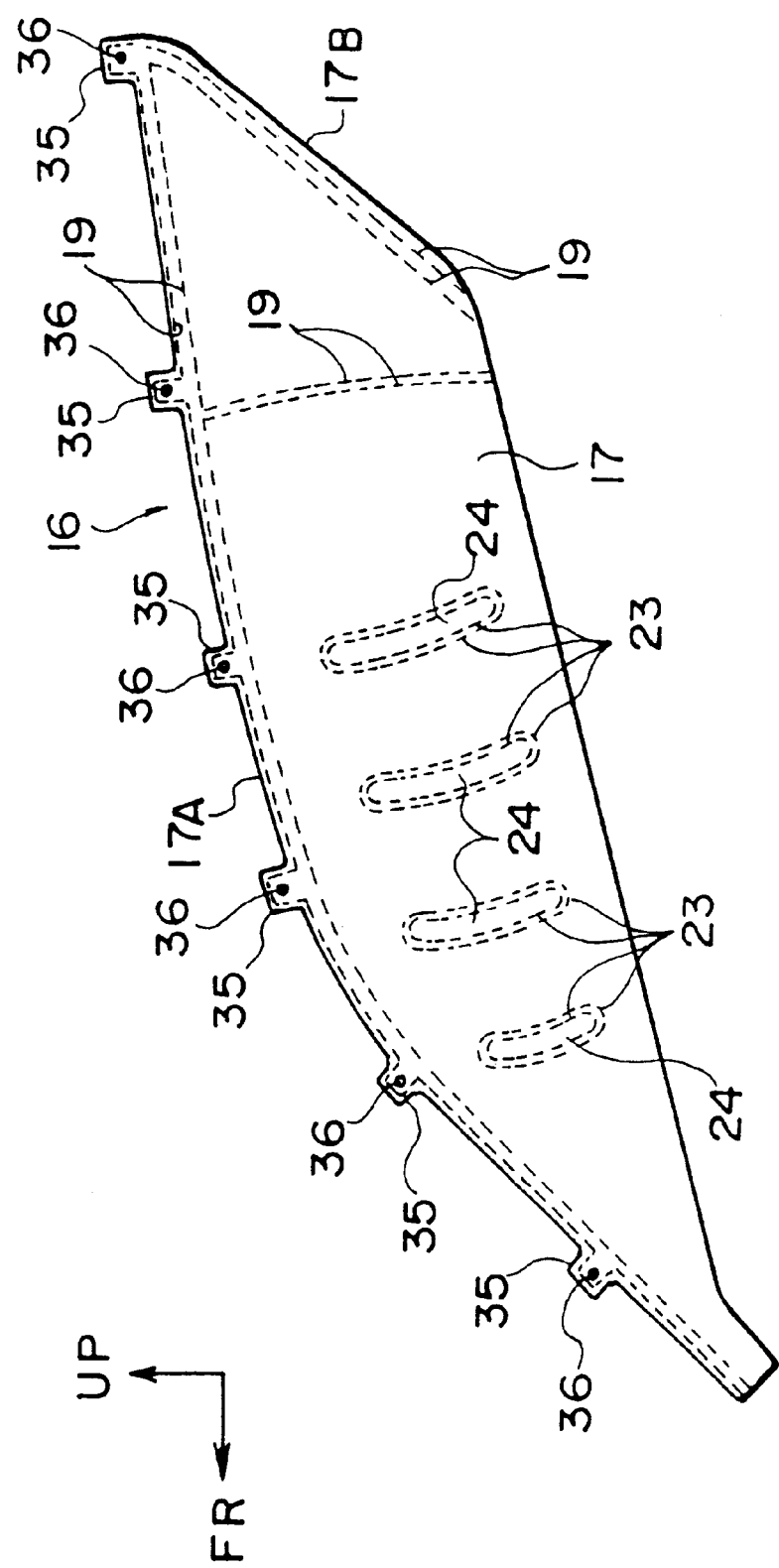
FIG. 5 is a schematic side view illustrating the expanded state of the air bag body in the structure for the placement of the head protecting air bag apparatus according to the first embodiment of the present invention.

As shown in FIG. 5, the air bag body 16 is formed such that a sheet of a base cloth 17 is folded substantially in half, and a doubled upper end edge portion 17A and a rear portion 17B are sewn closed using a sewing thread 19. The air bag body 16 is formed in a substantially parallelogram shape, and rectangular tongue-shaped mounting portions 35 are formed so as to protrude from the upper end edge portion 17A. A mounting hole 36 is formed at a substantially central portion of each of the mounting portions 35. The pitch between the mounting holes 36 is longer than that between the mounting holes in the vehicle body, and is set to be less than or equal to the length which is needed to cover the A pillar 20 and the roof side rail 28 without forming a gap therebetween at the time when the airbag body expands. Further, non-inflating portions 24 of the air bag body 16 are formed by sewing with a sewing thread 23 and by the application of a sealing agent.

Figure 1:
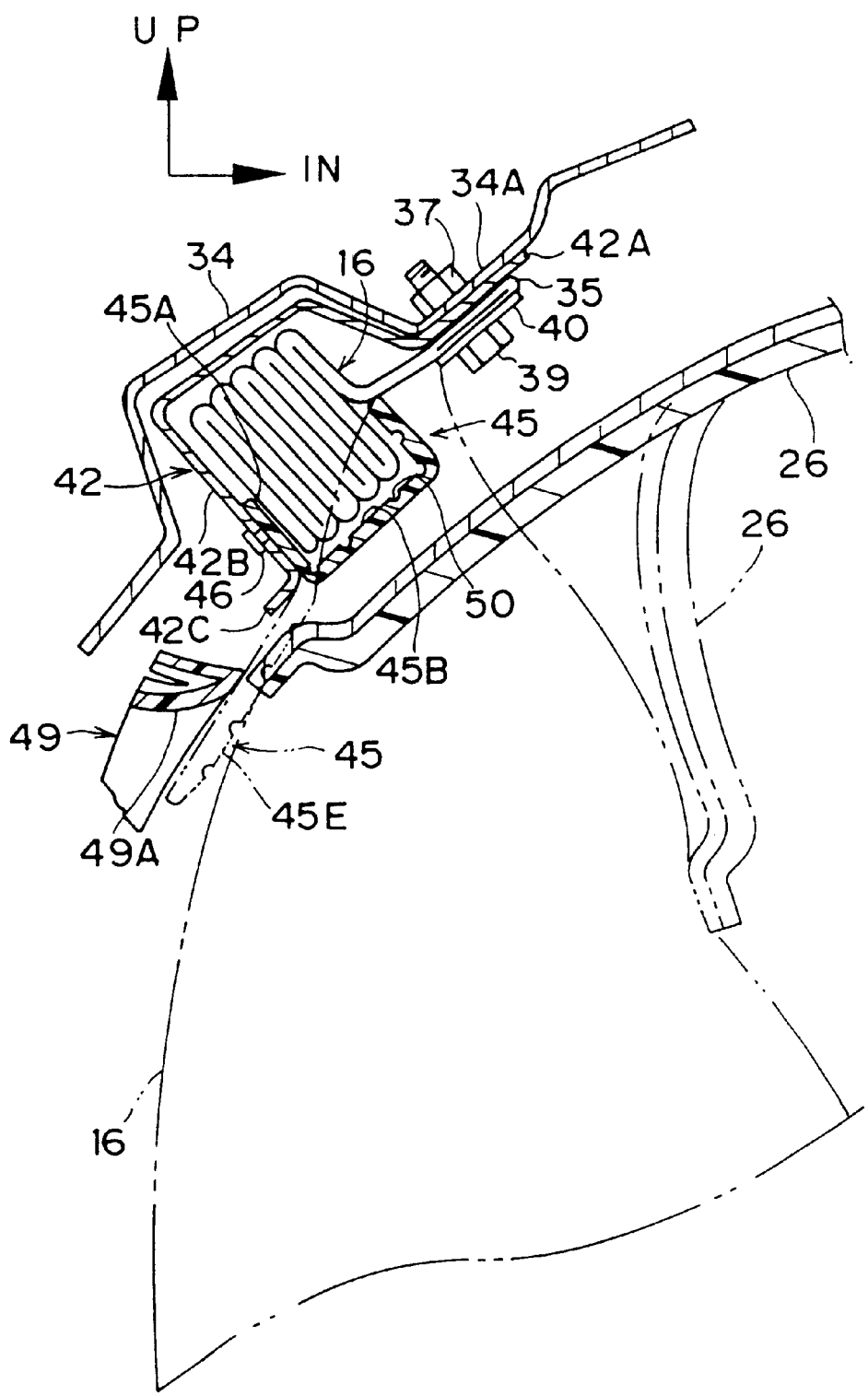
FIG. 1 is an enlarged cross sectional view taken along line 1—1 in FIG. 2.

As shown in FIG. 1, a roof head lining 26 as a ceiling portion interior member is disposed at the vehicle interior side of a roof side member inner panel 34 (which is simply referred to as an inner panel 34 hereinafter). At the time of expansion of the air bag body, as shown by the double-dashed line in FIG. 1, the gap between the roof head lining 26 and the upper end portion 49A of a B pillar garnish 49 is pushed open, and from this gap, the air bag body 16 expands toward the vehicle interior.

Figure 4:
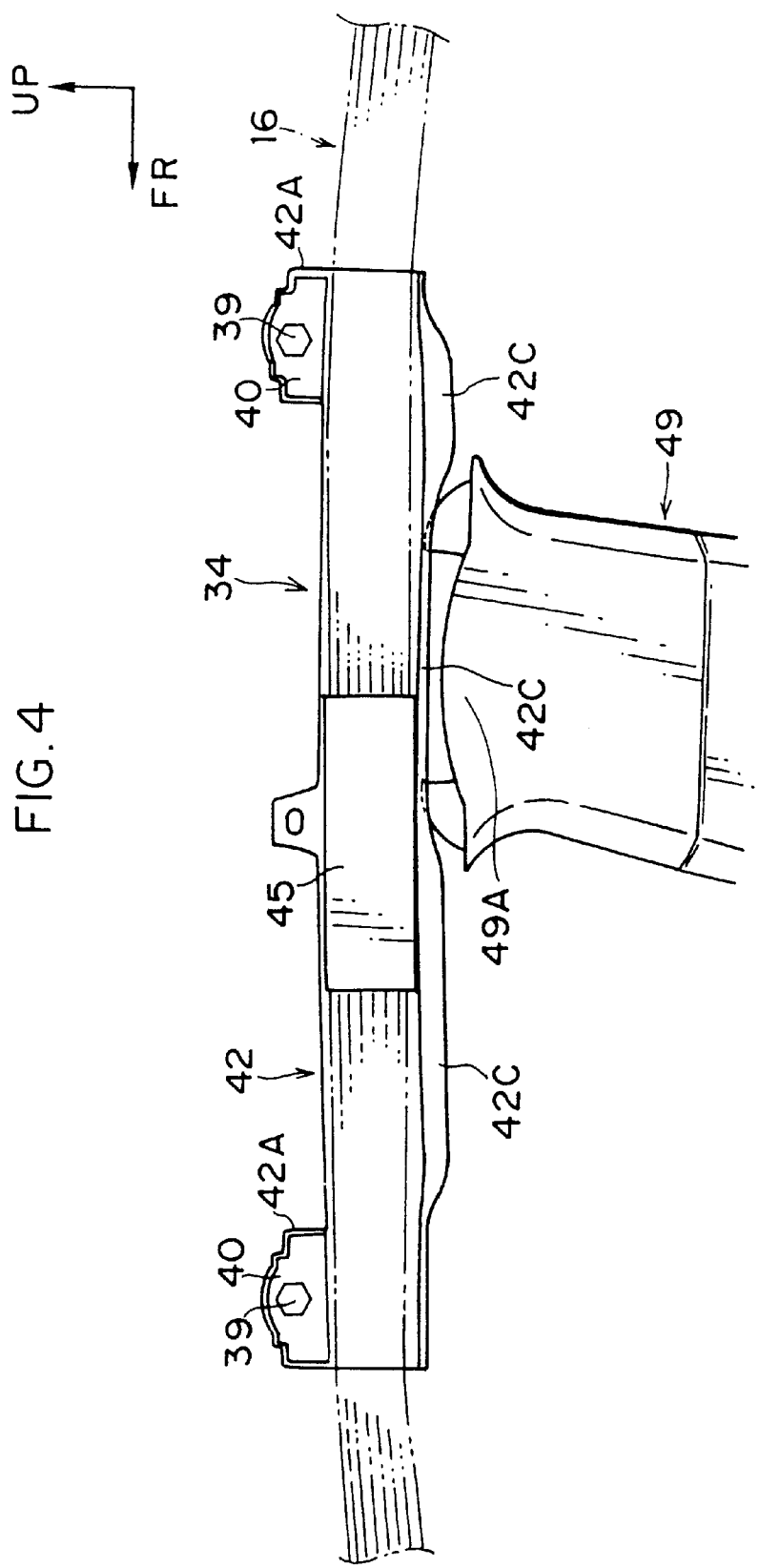
FIG. 4 is a schematic side view illustrating a main portion of the structure for the placement of the head protecting air bag apparatus according to the first embodiment of the present invention.
Figure 20:
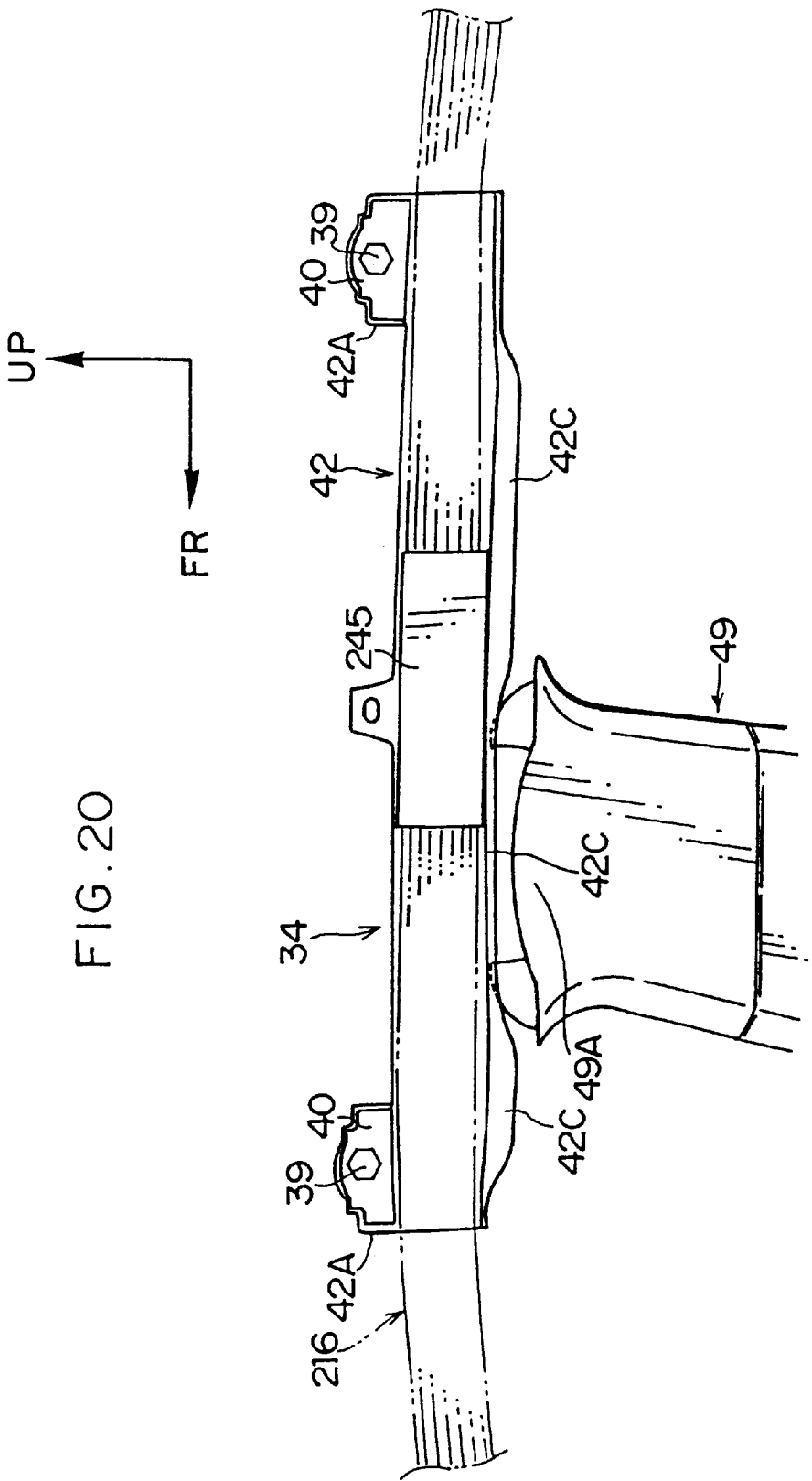
FIG. 20 is a schematic side view illustrating a state in which the air bag body is stored in the structure for the placement of the head protecting air bag apparatus according to the variant example of the first embodiment of the present invention.

As shown in FIGS. 4 and 20, each of the air bag bodies 16 and 216 folded in an accordion shape so as to form an elongated shape, the substantially central portion thereof in the vehicle longitudinal direction is held by a metal guiding and holding member 42 as a sheet metal plate. This guiding and holding member 42 is disposed so as to span over the upper end portion 49A of the B pillar garnish 49 in the vehicle longitudinal direction. The guiding and holding member 42 holds the air bag bodies 16 and 216, and guides the direction in which the air bag bodies 16 and 216 expand.

As shown in FIG. 1, the cross sectional configuration of the guiding and holding member 42 when viewed from the vehicle front is a substantially U-shape that is bent. The guiding and holding member 42 has a bottom wall portion 42B which forms a guiding surface and extends from the inner panel 34 to the upper end portion 49A of the B pillar garnish 49. The guiding and holding member 42 thus has a storing portion whose opening portion faces toward the vehicle interior. A guide flange portion 42C is formed at an end portion (a lower opening portion) of the bottom wall portion 42B so as to face downward, and the air bag body 16 is stored inside this substantially U-shaped region.

The mounting portions 35 of the air bag body 16 are clamped by metallic reinforcement plates 40, and by mounting flange portions 42A each of which is a mounting end portion of the guiding and holding member 42. The mounting portions 35, the reinforcement plates 40, and the mounting flange portions 42A of the guiding and holding member 42 are fixed to a concave portion 34A of the inner panel 34 by being fastened with weld nuts 37 and bolts 39.

A guide plate 45 serving as the air bag body expanding direction regulating member is disposed at the guiding and holding member 42. The guide plate 45 has a base end portion 45A which extends from the vehicle interior side to the vehicle exterior side. This base end portion 45A is fixed to the top surface of a bottom wall portion 42B of the guiding and holding member 42 by fixing means 46 such as rivets or the like. The cross sectional configuration of the guide plate 45 when viewed from the vehicle front shows the guide plate 45 surrounding a portion of the air bag body 16 in a folded state, and forming a substantial U shape whose opening portion faces toward the vehicle exterior.

Figure 2:
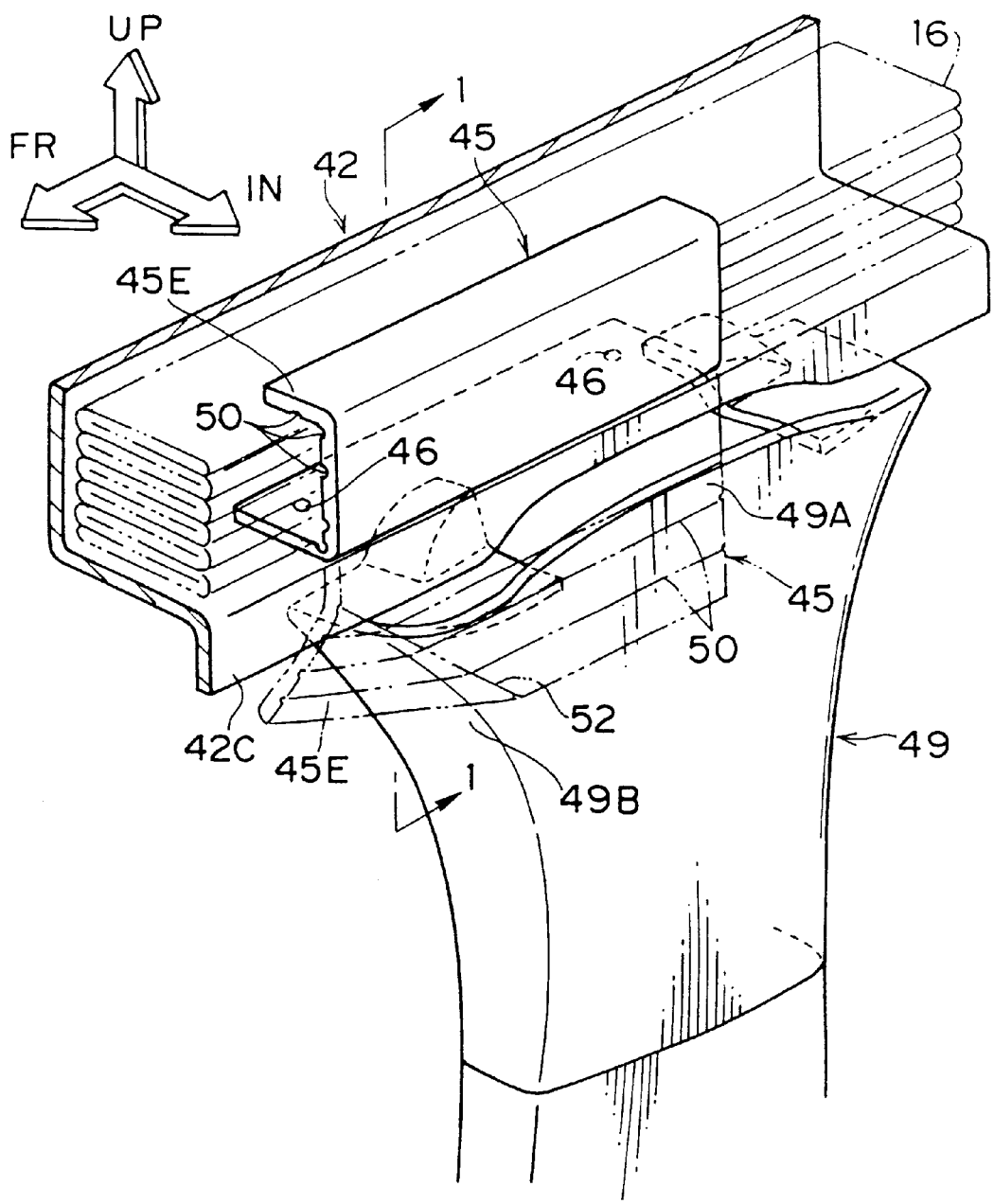
FIG. 2 is a perspective view illustrating a structure for the placement of a head protecting air bag apparatus according to a first embodiment of the present invention, as seen from within the vehicle at a diagonal from the front.
Figure 3:
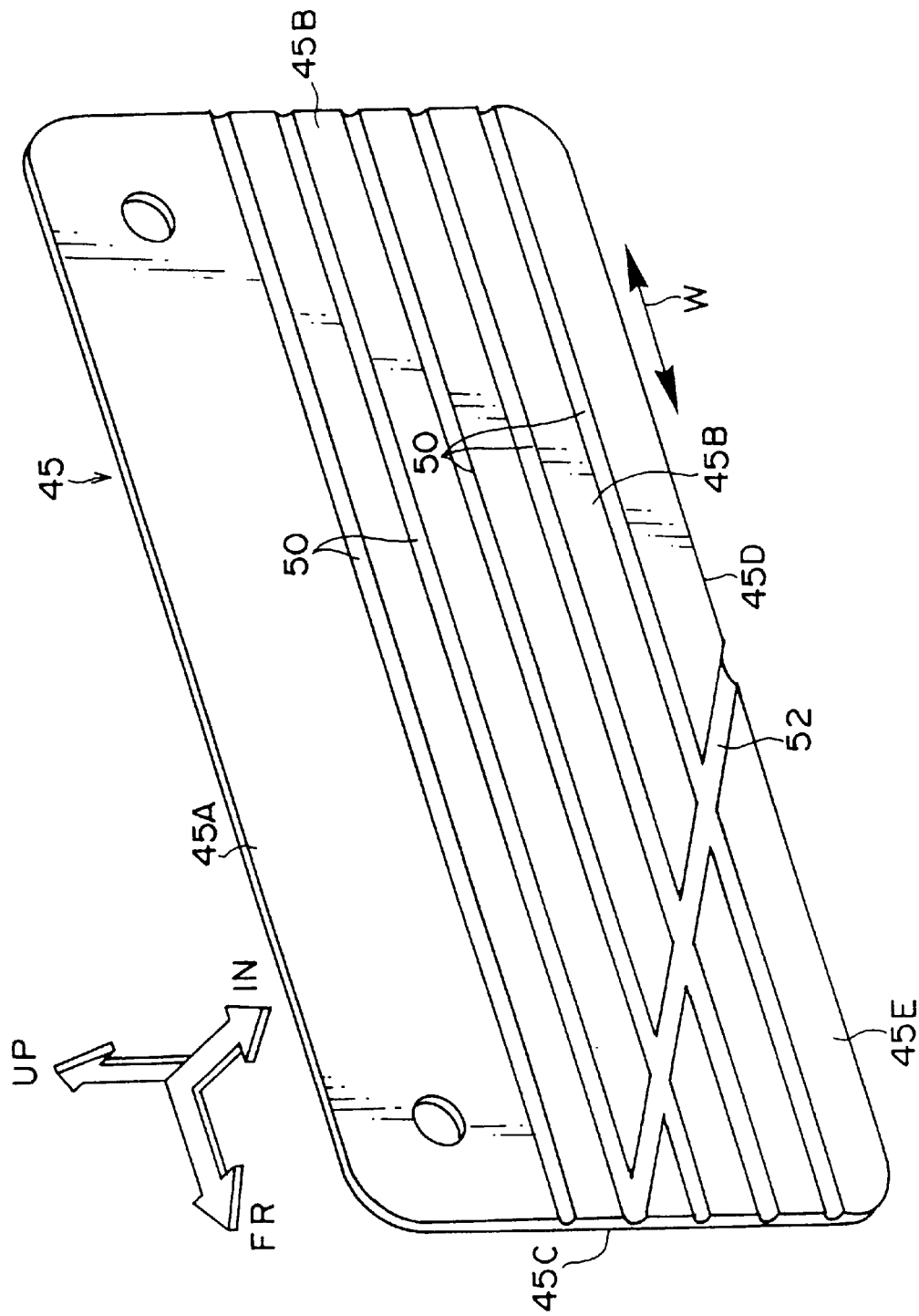
FIG. 3 is a perspective view illustrating the fully extended state of the air bag body expanding direction regulating means in the structure for the placement of the head protecting air bag apparatus according to the first embodiment of the present invention, as seen from within the vehicle at a diagonal from the front.

As shown in FIG. 3, the guide plate 45 is made from, for example, a resin material. A plurality of concave grooves 50, which are provided parallel to each other, are formed on an inner wall surface 45B of the guide plate 45 in the vehicle longitudinal direction (i.e., the direction indicated by arrow W in FIG. 3). The guide plate 45 can be easily bent through these concave grooves 50. An oblique concave groove 52 is formed in the inner wall surface 45B of the guide plate 45 extending from an end portion 45C at the inflator 14 side to the intermediate portion of an edge portion 45D in the vehicle longitudinal direction (an edge portion at the side of the end portion of the guide plate 45) on the side opposite the fixed side. This oblique concave groove 52 extends toward a terminal end portion 49B (see FIG. 2) at the inflator 14 side of the B pillar garnish 49 (which is simply referred to as the garnish 49 hereinafter) in the state in which the air bag body 16 is expanded. The oblique concave groove 52 thereby facilitates a corner portion 45E of the guide plate 45 to bend toward the vehicle exterior.

Figure 18:
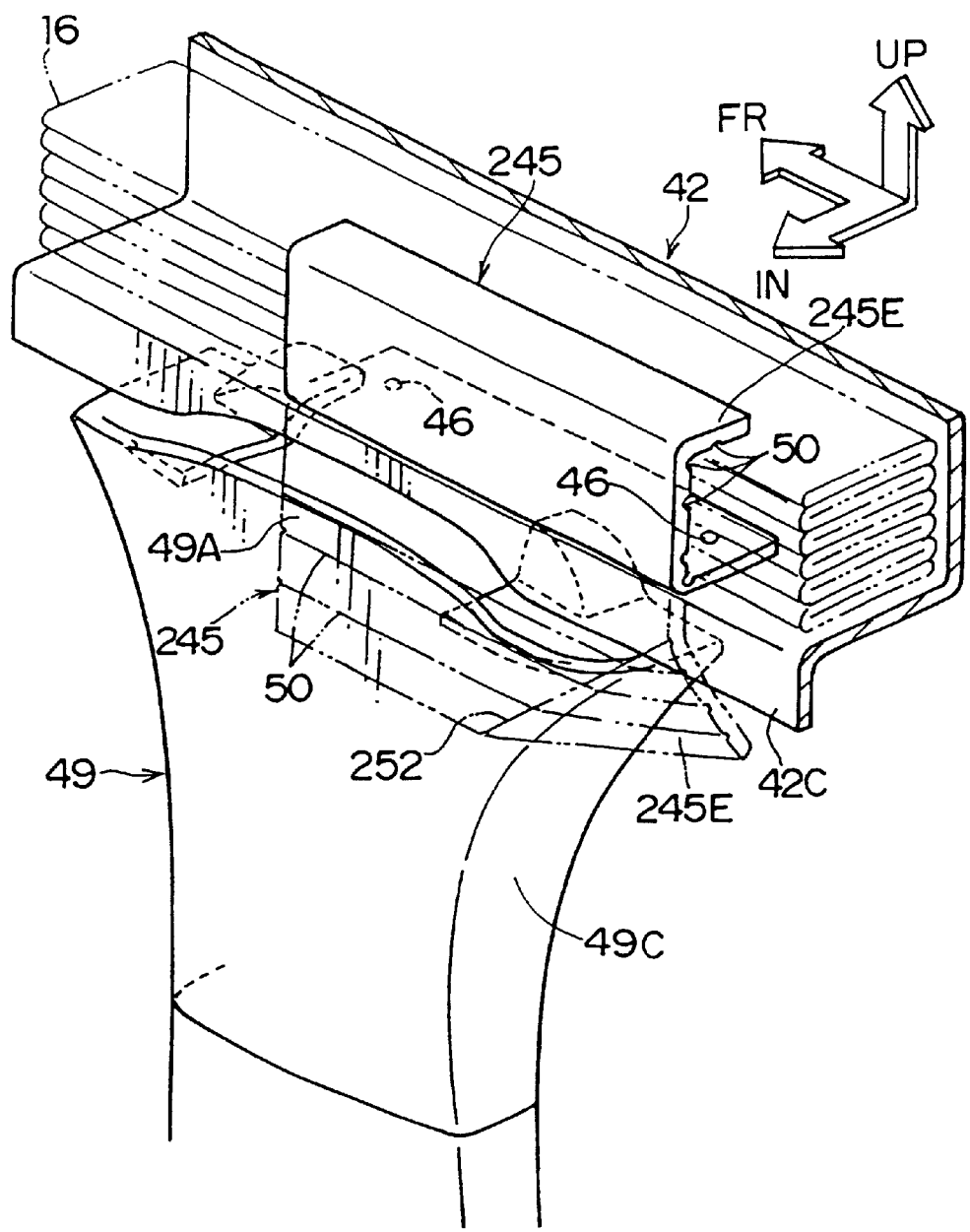
FIG. 18 is a perspective view illustrating the structure for the placement of a head protecting air bag apparatus according to the variant example of the first embodiment of the present invention, as seen from within the vehicle at a diagonal from the rear.
Figure 19:
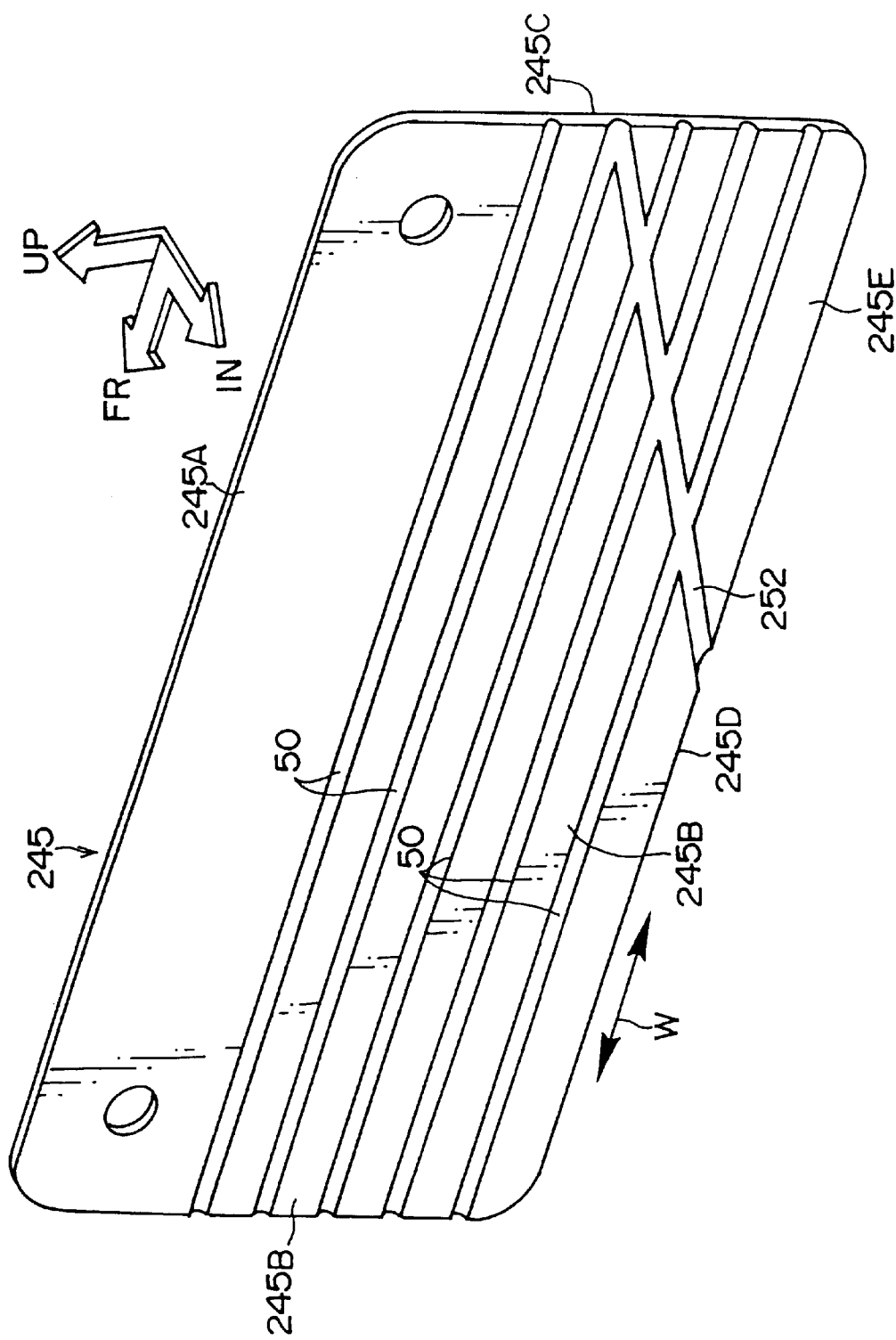
FIG. 19 is a perspective view illustrating an air bag expanding direction regulating means in the structure for the placement of a head protecting air bag apparatus according to the variant example of the first embodiment of the present invention, as seen from within the vehicle at a diagonal from the rear.

In the case in which the inflator is disposed at the rear end portion of the air bag body of the air bag apparatus 210 for the front and rear seats shown in FIG. 17, as is shown in FIG. 19, an oblique concave groove 252 is formed in an inner wall surface 245B of a guide plate 245 so as to extend from an end portion 245C at the inflator 14 side to the vehicle longitudinal direction intermediate portion of an edge portion 245D on the side opposite the fixed side. This oblique concave groove 252 extends toward a terminal end portion 49C (see FIG. 18) at the inflator 14 side of the garnish 49 in the state in which the air bag body 16 is expanded thus facilitating a corner portion 245E of the guide plate 245 to bend toward the vehicle exterior.

As a result, each of the guide plates 45 and 245, when extended, bends as is shown by the double-dashed line in FIGS. 2 and 18, and closes the gap between the guiding and holding member 42 and an inflator side end portion (front portion or rear portion) of the upper end portion 49A of the garnish 49. At the inflator 14 side end portion of the upper end portion 49A of the garnish 49, each of the corner portions 45E and 245E of the guide plates 45 and 245 bends along the outline of the garnish 49 toward the vehicle exterior.

A description of an operation of the present embodiment will be given hereinafter.

When a high load of a predetermined value or greater is applied to a vehicle side portion, the state where the high load of a predetermined value or greater has been applied is detected by the sensor 12. Therefore, a predetermined operating current is energized from a central control unit to the ignition device of the inflator 14, and the inflator 14 is operated. Accordingly, gas is ejected from the inflator 14, and the air bag body 16, which is stored in a folded state so as to form an elongated shape, is inflated from the inflator 14 side so as to expand into a curtain-like form so as to span over to the B pillar along the roof side rail portion.

In this case, the air bag body 16 inflates toward the inner side of the vehicle interior along the guide flange portion 42C of the guiding and holding member 42, while the expansion of the air bag body 16 reaches a position near the inflator side of the center pillar 18 and then reaches a position beyond the intermediate portion of the center pillar 18 in the vehicle longitudinal direction.

In the present embodiment, as shown by the doubledashed line in FIG. 2, the guide plate 45 extends due to the expansion force of the air bag body 16. The guide plate 45 easily bends at the concave groove 50 which is formed on the inner wall surface 45B, and closes the gap between the guiding and holding member 42 and the end portion at the inflator 14 side of the upper end portion 49A of the garnish 49. Further, due to the existence of the oblique concave groove 52 which is formed on the inner wall surface 45B, at the end portion at the inflator 14 side of the upper end portion 49A of the garnish 49, the corner portion 45E bends toward the vehicle exterior along the outline of the garnish 49.

As a result, as shown by the double-dashed line in FIG. 1, the guide plate 45 which has been extended can prevent the air bag body 16 in the course of expansion thereof from tightly contacting the upper end portion 49A of the garnish 49, and from entering into the gap between the upper end portion 49A of the garnish 49 and the vehicle body. Therefore, since the air bag body 16 can be expanded more smoothly, the displacement of the garnish 49 can be prevented so that the stability of the expansion performance of the air bag body can be ensured.

In the present embodiment, since the concave grooves 50 and 52 are formed on the inner wall surface 45B of the guide plate 45, in accordance with the expansion of the air bag body 16, as shown by the double-dashed line in FIG. 1, the guide plate 45 can easily bend toward the outer side of the aforementioned substantial U shape. As a result, since the concave grooves 50 and 52 are formed on the inner wall surface 45B of the plate 45, the load for extending the guide plate 45 is minimized so that the air bag body 16 can be expanded much more smoothly.

Also, at the time of a vehicle side collision, even if the upper end portion 49A of the garnish 49 is displaced from the vehicle body and is lifted up toward the vehicle interior, prior to the expansion of the air bag body 16, the extending portion at the edge portion side of the guide plate 45 extends so as to cover the upper end portion 49A of the garnish 49. Accordingly, the air bag body 16 in the course of expansion thereof is prevented from tightly contacting the upper end portion 49A of the garnish 49 and entering into the gap between the garnish 49 and the vehicle body. As a result, the air bag body 16 can be expanded much more smoothly, and the displacement of the garnish 49 from the vehicle body can be prevented.

Figure 8:
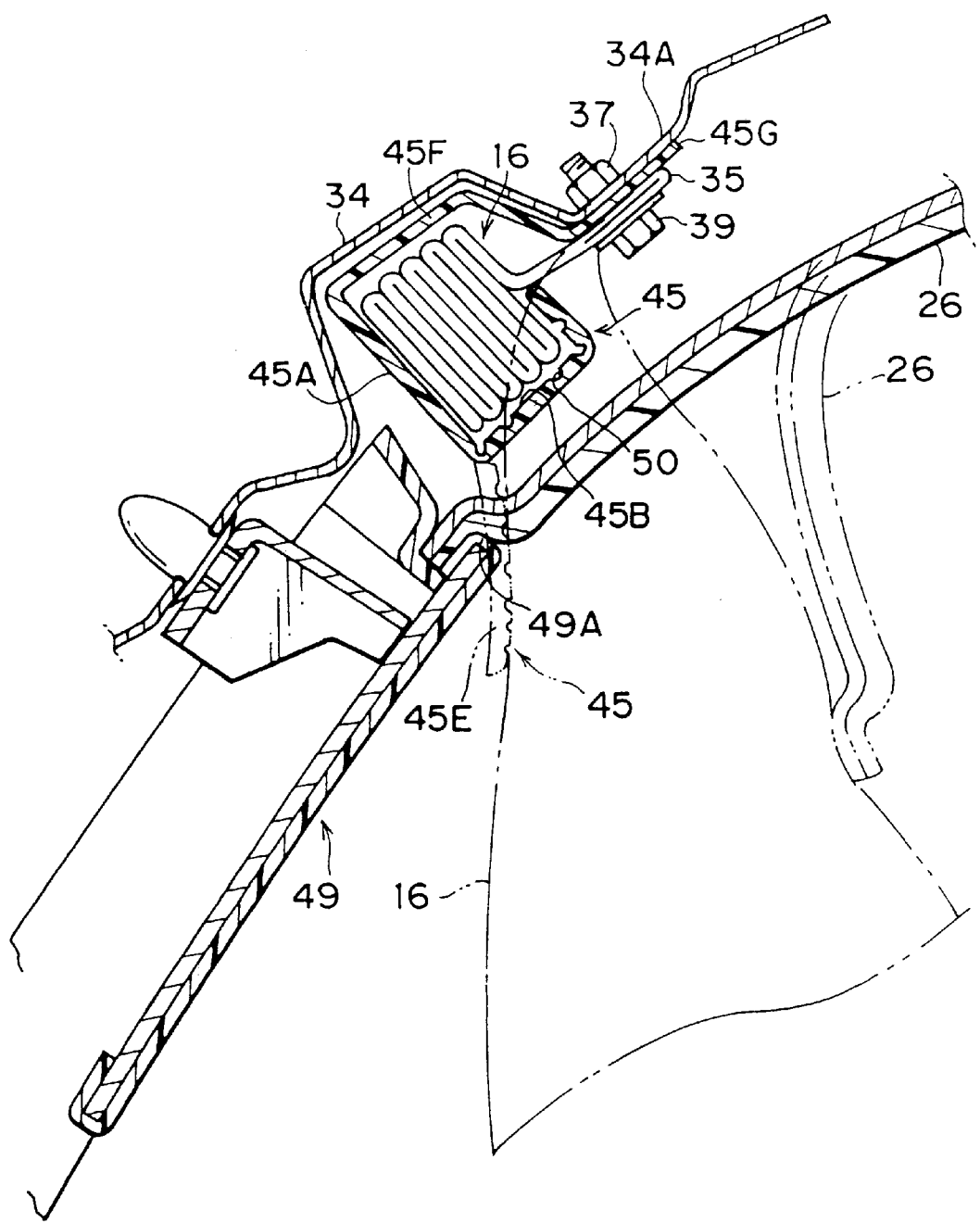
FIG. 8 is an enlarged cross sectional view taken along line 8—8 in FIG. 9.
Figure 9:
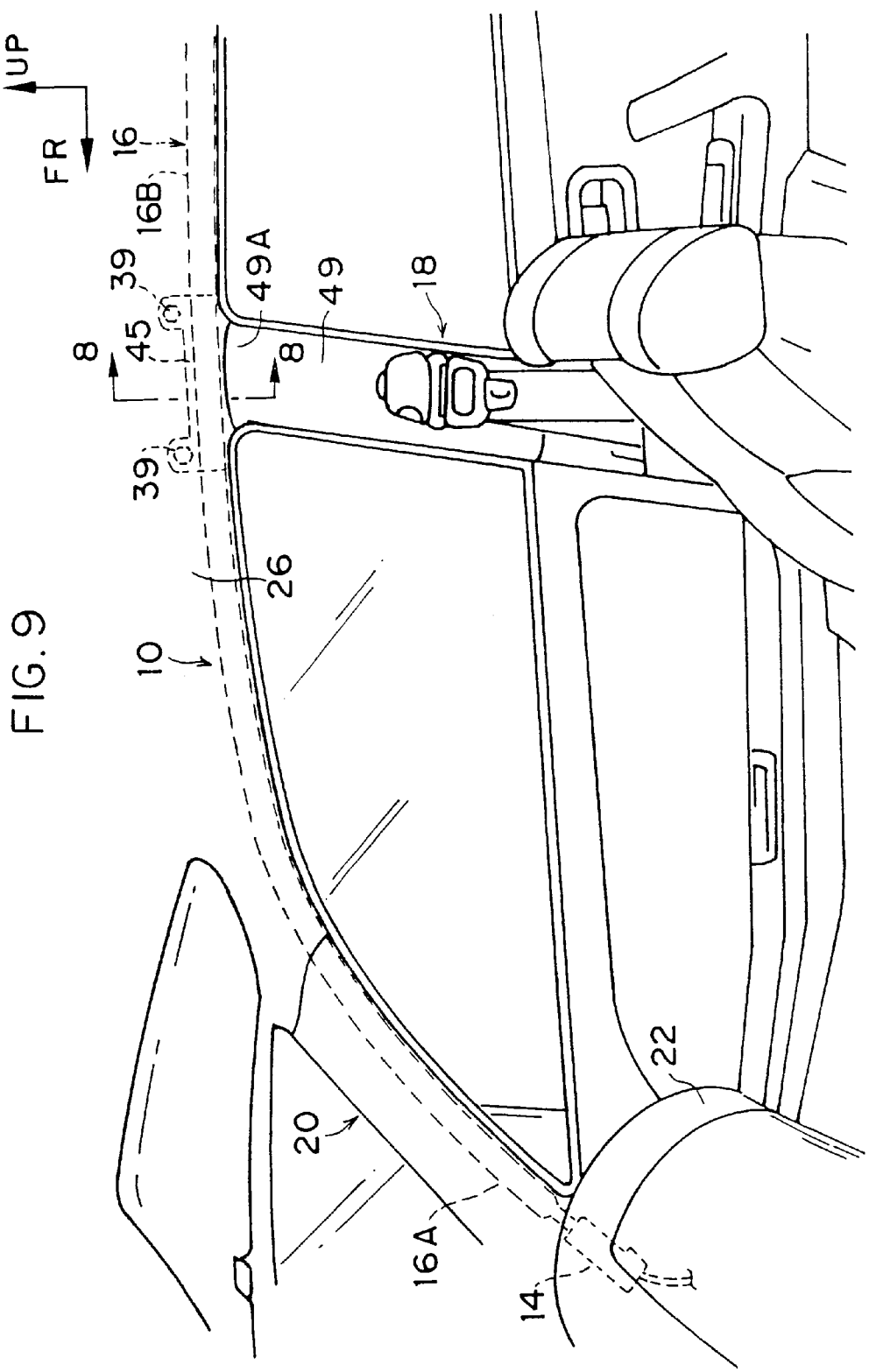
FIG. 9 is a schematic side view illustrating the structure for the placement of the head protecting air bag apparatus according to a variant example of the first embodiment of the present invention.

In the present embodiment, as shown in FIG. 1, the mounting flange portion 42A fixes the base end portion 45A of the guide plate 45 to the bottom wall portion 42B of the guiding and holding member 42 which is fastened and fixed to the inner panel 34 by the weld nuts 37 and the bolts 39. Alternatively, as shown in FIG. 8, the base end portion 45A of the guide plate 45 shown in FIG. 1 may be extended upwardly along the inner panel 34. The upper end portion 45G of this extended portion 45F is then directly fixed to the inner panel 34 by being fastened with weld nuts 37 and bolts 39. Accordingly, it is possible to eliminate the guiding and holding member. In this case, since the guide plate 45 also serves as the guiding and holding member, as shown in FIG. 9, it is preferable to make the length of the guide plate 45 in the vehicle longitudinal direction longer than that of the upper end portion 49A of the garnish 49 in the vehicle longitudinal direction. Further, at the upper end rear portion of the garnish 49 as well, it is preferable to prevent the air bag body 16 in the course of expansion thereof from tightly contacting the upper end portion 49A of the garnish 49, and from entering into the gap between the upper end portion 49A of the garnish 49 and the vehicle body.

Figure 10:
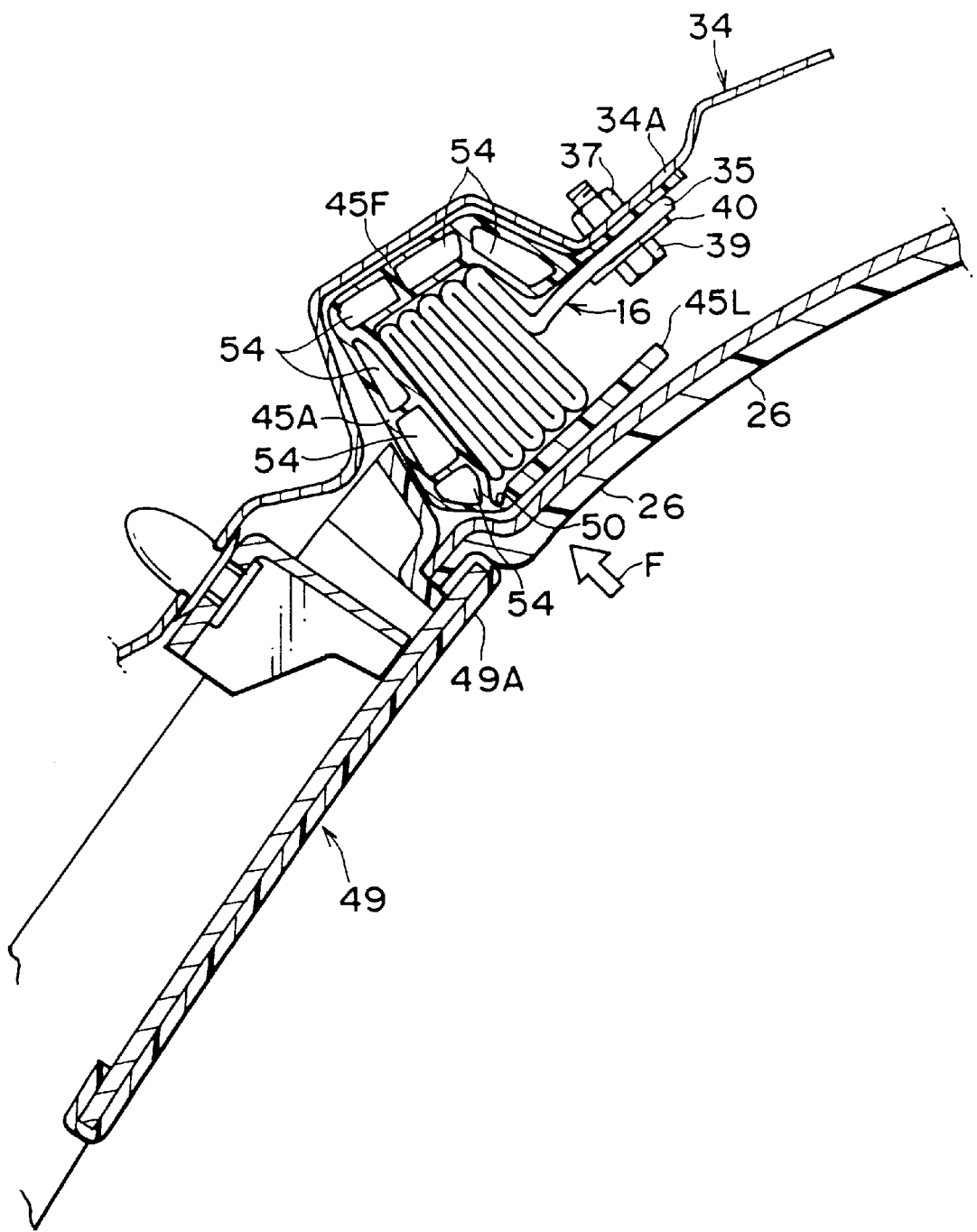
FIG. 10 is a cross sectional view illustrating a structure for the placement of a head protecting air bag apparatus according to a second embodiment of the present invention, as seen from the vehicle front.
Figure 11:
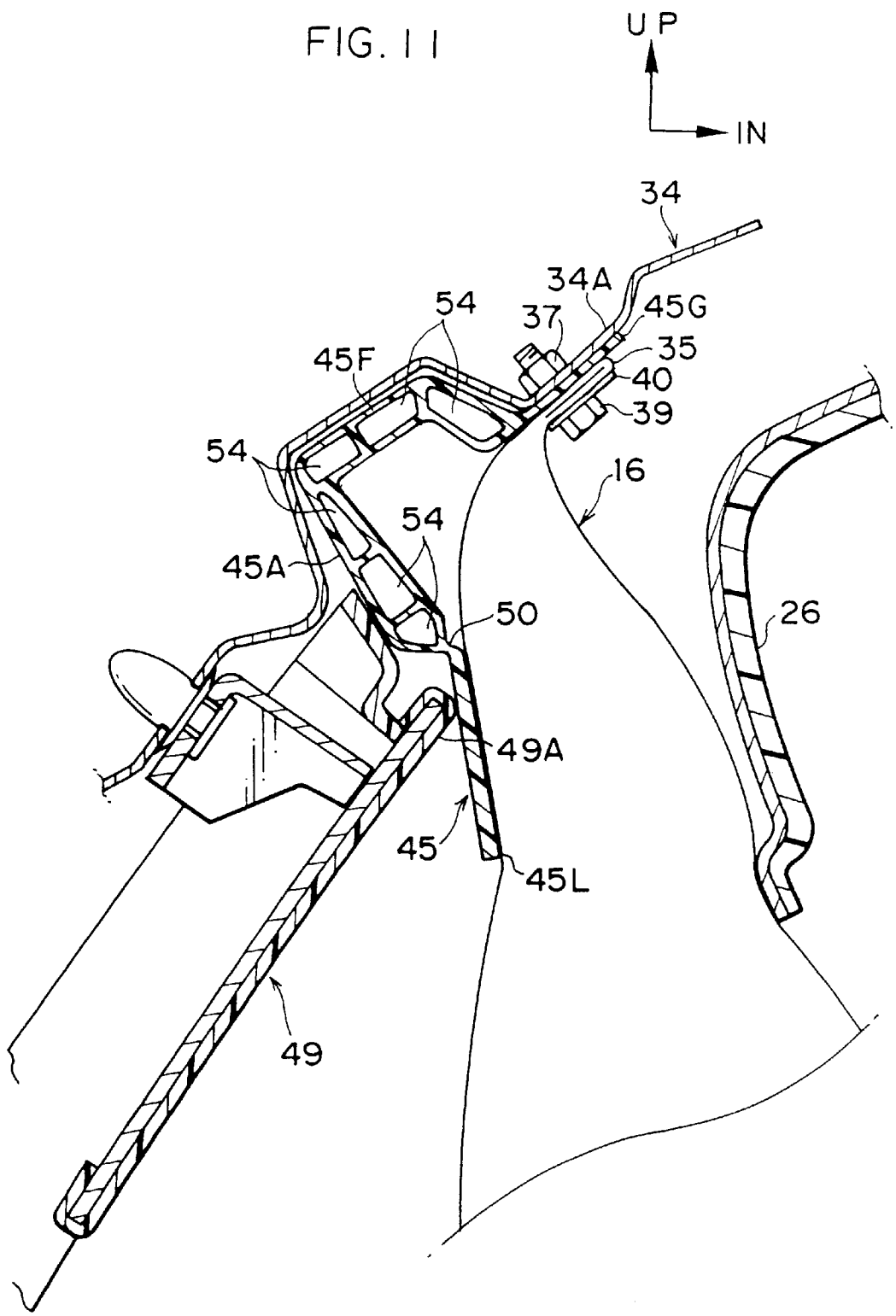
FIG. 11 is a cross sectional view illustrating the expanded state of the air bag body in the structure for the placement of the head protecting air bag apparatus according to the second embodiment of the present invention, as seen from the vehicle front.

With reference to FIGS. 10 and 11, a description of a structure for the placement of a head protecting air bag apparatus according to a second embodiment of the present invention will be given.

Portions identical to those in the first embodiment are denoted by the same reference numerals, and a description thereof will be omitted.

As shown in FIG. 10, in the present embodiment, the guide plate 45 is constructed as an extrusion molding product which is made from a soft resin and which has a substantially U-shaped cross sectional configuration. A plurality of hollow portions 54 which extend in the longitudinal direction of the guide plate 45 are formed, through extrusion molding, on the base end portion 45A of the guide plate 45 and on the extending portion 45F which is provided so as to extend upwardly along the inner panel 34.

At the time of expansion of the air bag body, as shown in FIG. 11, since the guide plate 45 bends at the concave groove 50 and extends towards the vehicle interior, it is possible to obtain the same effect of operation as the first embodiment of the present invention.

On the other hand, because the guide plate 45 according to the present embodiment is an extrusion molding product made from soft resin, and has a plurality of the hollow portions 54 which extend in the longitudinal direction of the guide plate 45 at the base end portion 45A of the guide plate 45 and at the extending portion 45F which is provided so as to extend upwardly along the inner panel 34, at the time of non-expansion of the air bag body, in the case in which the vehicle occupant hits a region of the roof head lining 26 which corresponds to a region where the guide plate 45 is placed, due to the impact load which is applied from the vehicle interior side to the vehicle exterior side (the direction of arrow F in FIG. 10), the base end portion 45A of the guide plate 45, and the extending portion 45F easily contract and deform, thereby allowing the impact load to be moderated. This is particularly effective when the roof head lining 26 is manufactured so as to have a high degree of rigidity under various circumstances, thereby causing the displacement of the roof head lining 26 from the garnish 49 to be difficult.

For example, when the guide plate 45 is metallic, in order to prevent the air bag body 16 from being damaged by an edge of the guide plate 45, for example, the edge indicated by reference numeral 45L in FIG. 11, it is necessary to apply a treatment such as coating or the like to the edge. Conversely, the present embodiment does not need an edge treatment such as that described above. Accordingly, the apparatus of the present invention can be manufactured inexpensively.

Next, with reference to FIG. 12, a structure for the placement of a head protecting air bag apparatus according to a third embodiment of the present invention will be explained.

Portions identical to those in the second embodiment are denoted by the same reference numerals, and a description thereof will be omitted.

Figure 12:
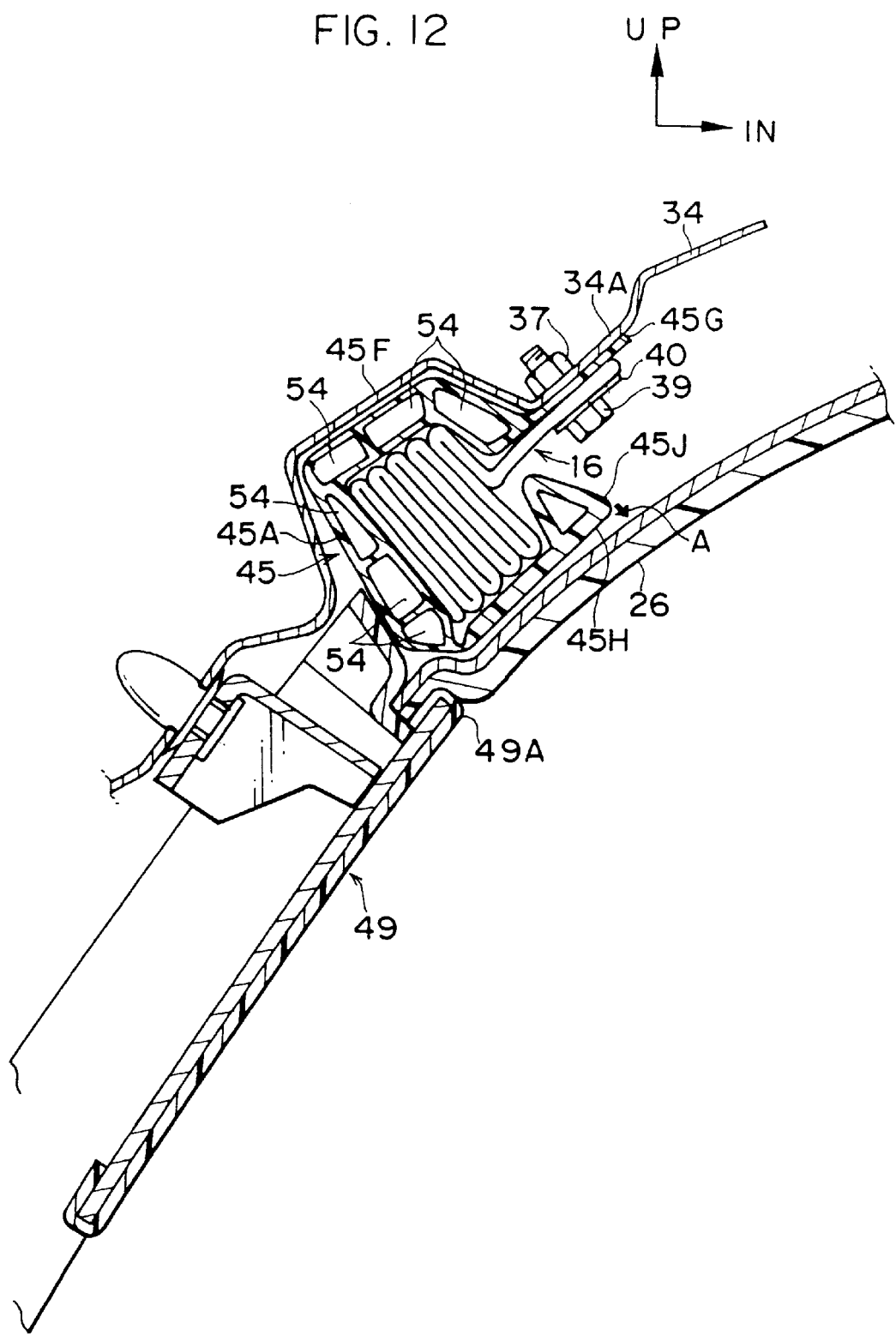
FIG. 12 is a cross sectional view illustrating a structure for the placement of a head protecting air bag apparatus according to a third embodiment of the present invention, as seen from the vehicle front.

As shown in FIG. 12, in the present embodiment, a projection 45J is formed at an edge portion 45H of the guide plate 45. The projection 45J is formed having a hollow triangular cross sectional configuration. At the time of expansion of the air bag body, when the guide plate 45 extends, the projection 45J pushes the roof head lining 26 from the vehicle exterior side to the vehicle interior side (the direction indicated by arrow A in FIG. 12).

In the present embodiment, the same effect of the operation as the second embodiment can be obtained, and at the time of expansion of the air bag body, when the guide plate 45 extends, the projection 45J which is formed at the edge portion 45H of the guide plate 45 pushes the roof head lining 26 from the vehicle exterior side to the vehicle interior side (the direction indicated by arrow A in FIG. 12). As a result, since the pushing force from the guide plate 45 at the time of expansion of the air bag body is effectively transmitted to the roof head lining 26, the roof head lining 26 can be reliably pushed towards the vehicle interior, and the edge portion 45H of the guide plate 45 and the upper end portion 49A of the garnish 49 can be overlapped with each other. Further, the projection 45J can be formed without a hollow, and the cross sectional configuration thereof can be formed in a circular shape, a rectangular shape, or the like.

With reference to FIGS. 13 and 14, and FIGS. 21 and 22, a description of a structure for the placement of a head protecting air bag apparatus according to a fourth embodiment of the present invention will be given hereinafter.

Portions identical to those in the first embodiment are denoted by the same reference numerals, and a description thereof will be omitted.

Figure 13:
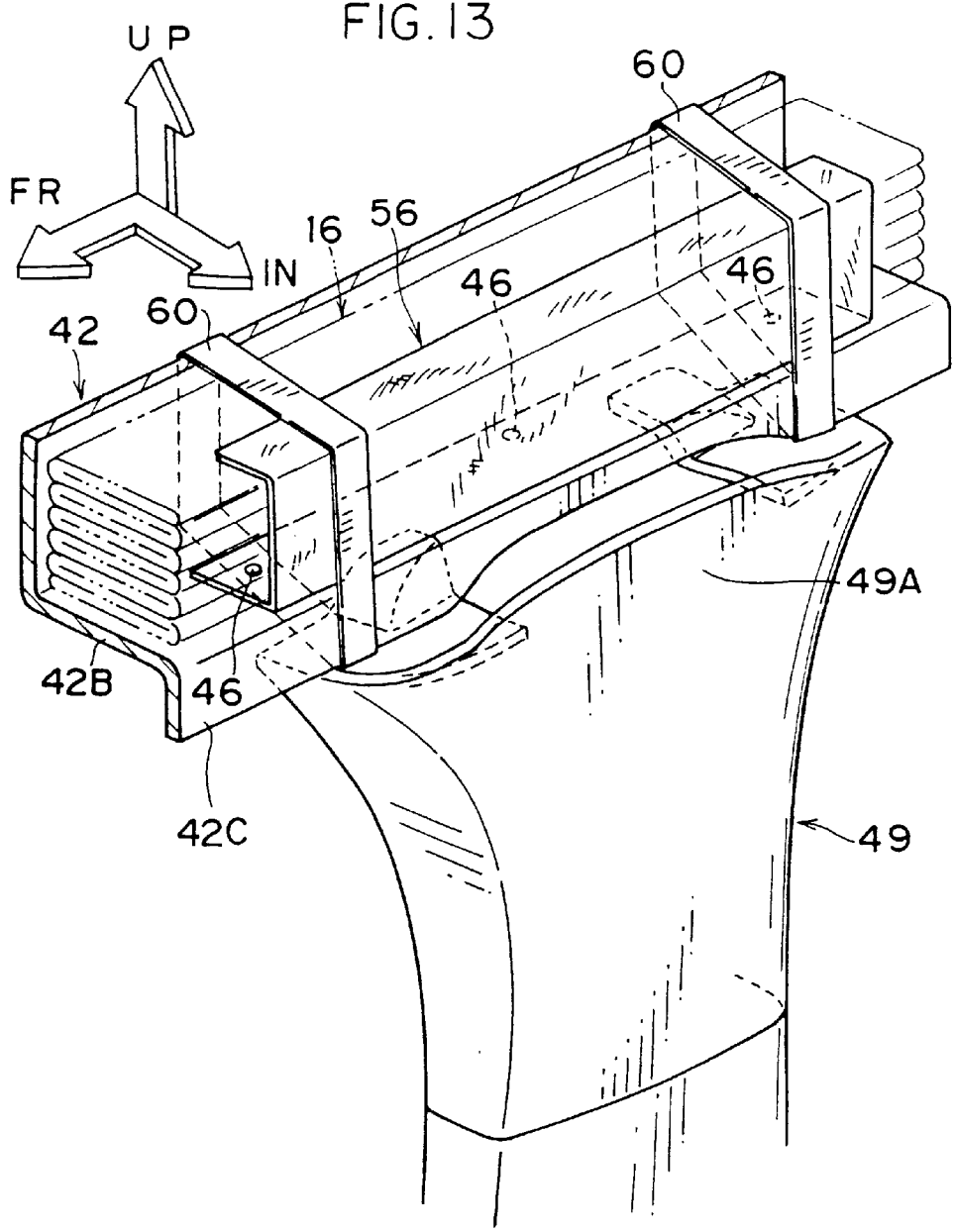
FIG. 13 is a perspective view illustrating a structure for the placement of a head protecting air bag apparatus according to a fourth embodiment of the present invention, as seen from within the vehicle at a diagonal from the front.
Figure 14:
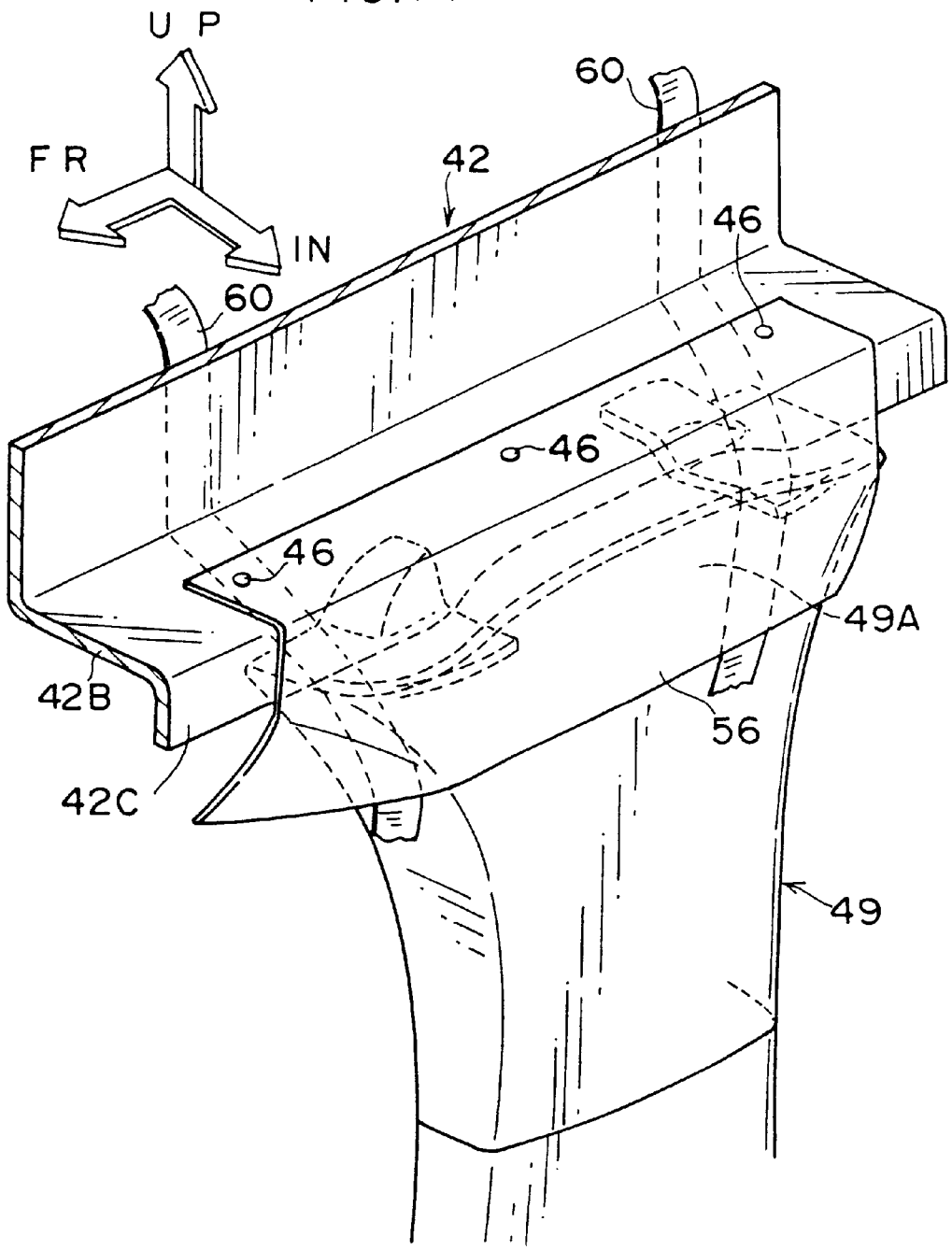
FIG. 14 is a perspective view illustrating the expanded state of the air bag body in the structure for the placement of the head protecting air bag apparatus according to a fourth embodiment of the present invention, as seen from within the vehicle at a diagonal from the front.
Figure 21:
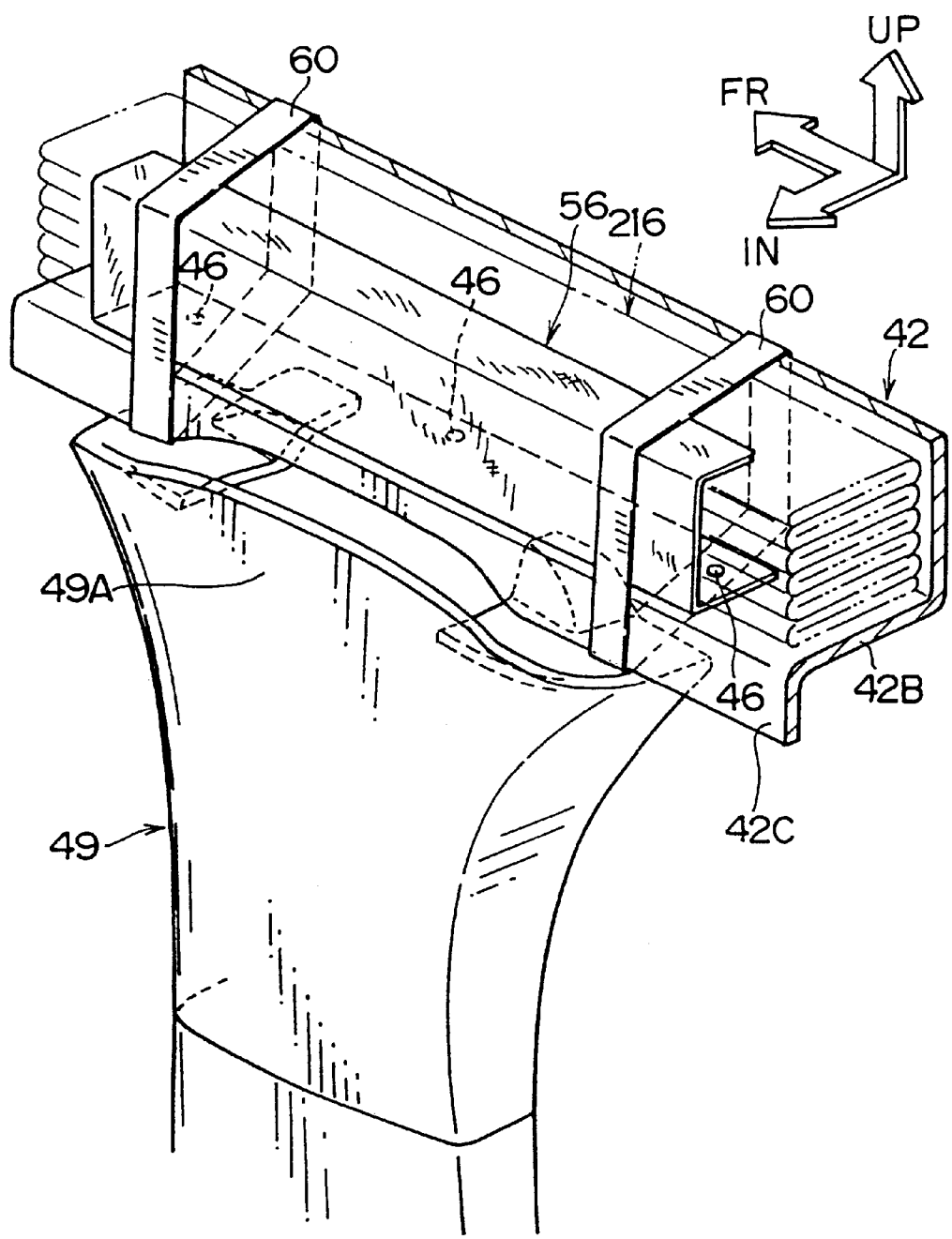
FIG. 21 is a perspective view illustrating the structure for the placement of a head protecting air bag apparatus according to a variant example of the fourth embodiment of the present invention.
Figure 22:
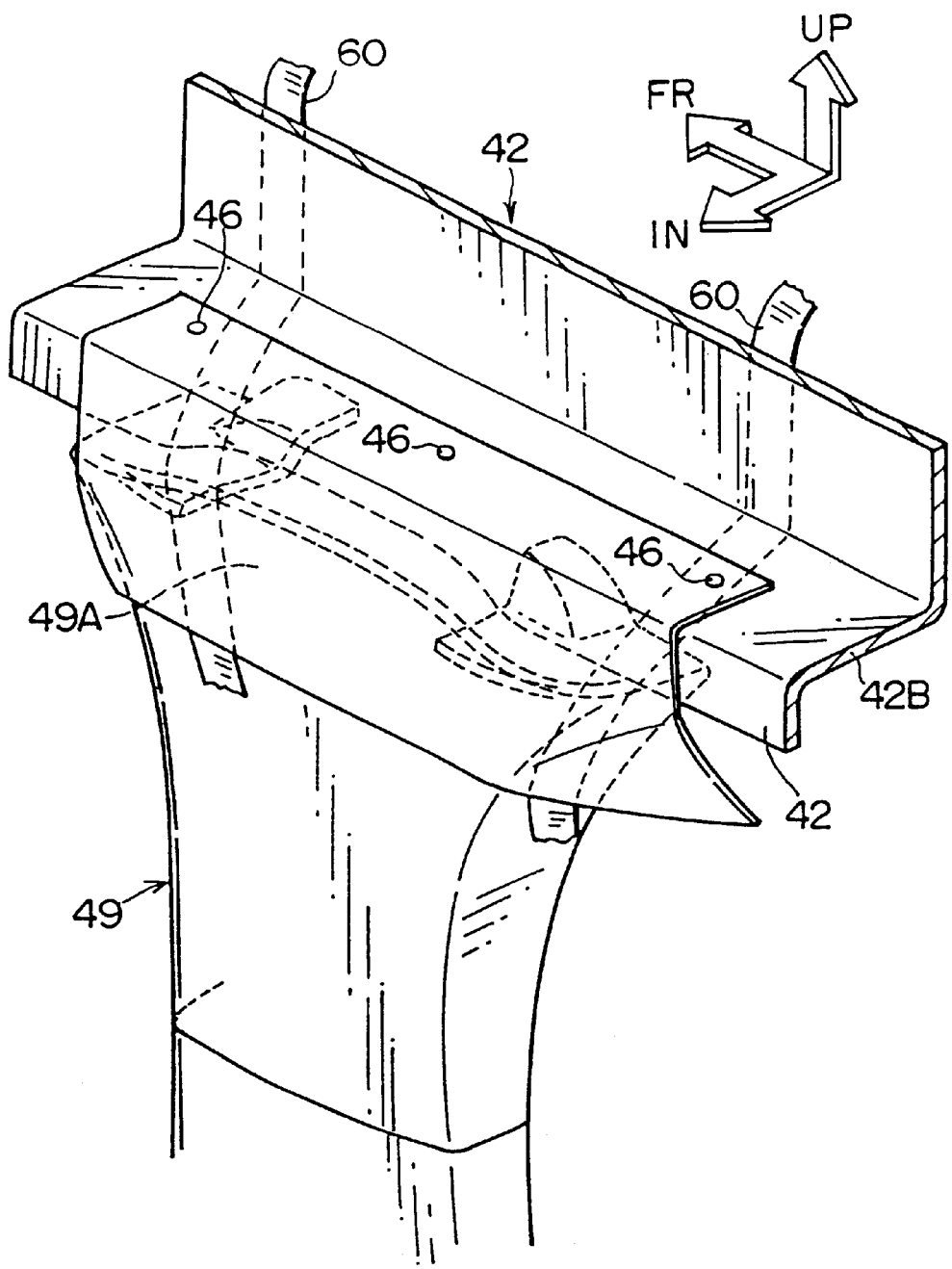
FIG. 22 is a perspective view illustrating an expanded state of the air bag body in the structure for the placement of the head protecting air bag apparatus according to the variant example of the fourth embodiment of the present invention, as seen from within the vehicle at a diagonal from the front.

As shown in FIGS. 13 and 21, in the present embodiment, instead of the guide plate 45 of the first embodiment (see FIG. 1), a cloth belt 56 which is used as an air bag body expanding direction regulating member is fixed to the upper surface of the bottom wall portion 42B of the guiding and holding member 42 through the fixing means 46 such as rivets or the like. The cloth belt 56 is disposed at the outer circumferential portion of the folded air bag body 16 so as to form a substantially U-shaped cross sectional configuration, when viewed from the direction of the front of the vehicle, whose opening portion faces the outer side of the vehicle. The vehicle front and rear portions of the cloth belt 56 are respectively fixed to the guiding and holding member 42 by loop-shaped, long, narrow fixing members 60 such as adhesive tapes or strings. These fixing members 60 can be easily broken at the time of expansion of the air bag body 16. When the fixing members 60 are broken, the cloth belt 56 extends towards the vehicle interior and as shown in FIGS. 14 and 22, closes the gap between the guiding and holding member 42 and the upper end portion 49A of the garnish 49. The fixing members 60 is not necessarily formed in a closed loop shape. It suffices that the fixing members 60 fix the cloth belt 56 and the air bag body 16 to the guiding and holding member 42. Further, the fixing members 60 can also be used for all of the embodiments other than the fourth embodiment of the present invention in the same way as in the fourth embodiment.

In the present embodiment, at the time of expansion of the air bag body, the inflation force of the air bag body 16 is transmitted to the fixing members 60 via the cloth belt 56, and the fixing members 60 are broken. When the fixing members 60 are broken, the cloth belt 56 extends towards the vehicle interior and, as shown in FIGS. 14 and 22, closes the gap between the guiding and holding member 42 and the upper end portion 49A of the garnish 49. At this time, in the present embodiment, due to the use of the cloth belt 56, the cloth belt 56 is easy to deform, easy to conform to the configuration of the upper end portion 49A of the garnish 49, and is able to reliably cover the upper end portion 49A of the garnish 49. Further, because the belt is made of cloth, at the time of expansion of the air bag body, it is not broken and dispersed so that it can be assembled easily, and the manufacturing costs thereof are low.

A cloth belt such as a seat belt webbing which has suitable elasticity and which can introduce the air bag body 16 in a predetermined direction is used preferably as the cloth belt 56.

Next, with reference to FIG. 15, the structure for the placement of a head protecting air bag apparatus according to a fifth embodiment of the present invention will be explained.

Portions identical to those in the first embodiment of the present invention are denoted by the same reference numerals, and a description thereof will be omitted.

Figure 15:
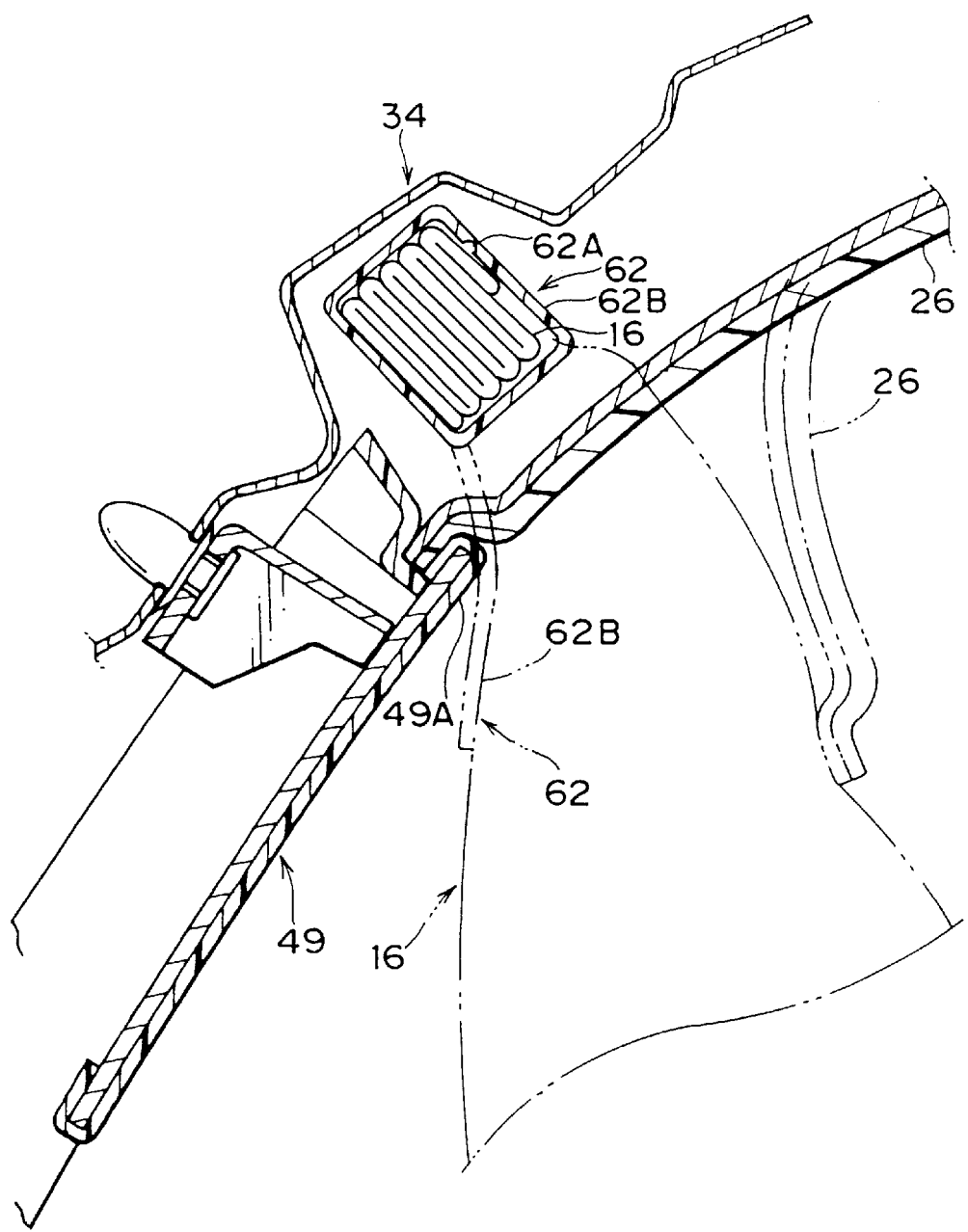
FIG. 15 is a cross sectional view illustrating a structure for the placement of a head protecting air bag apparatus according to a fifth embodiment of the present invention, as seen from the vehicle front.
Figure 16:
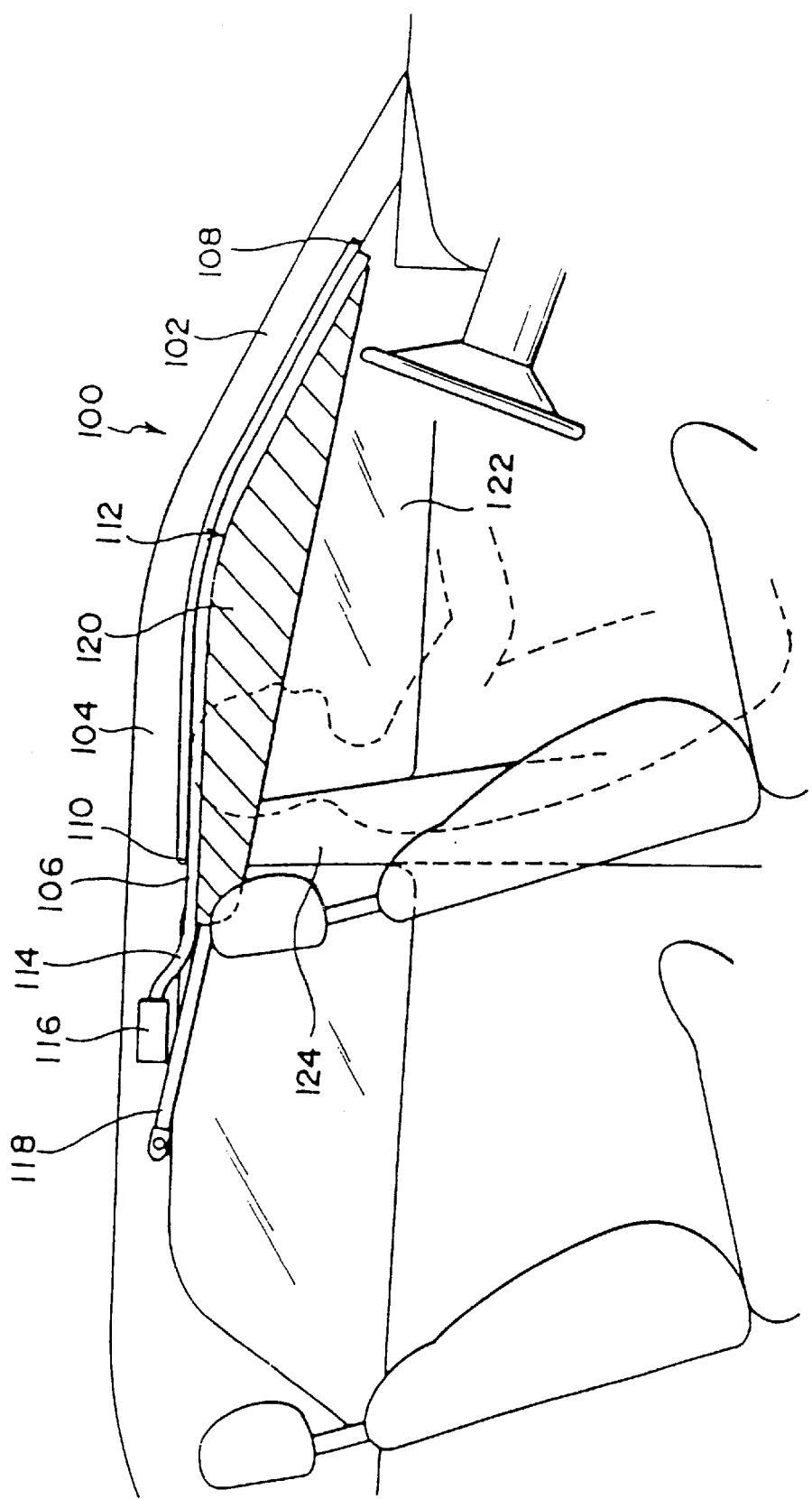
FIG. 16 is a schematic side view illustrating a state in which the expansion of an air bag body in the structure for the placement of a head protecting air bag apparatus according to an embodiment of prior art has been completed.

As shown in FIG. 15, in the present embodiment, instead of the guide plate 45 of the first embodiment (see FIG. 1), an annular member 62 for maintaining the folded shape of the air bag body is used as an air bag body expanding direction regulating member. The annular member 62 is formed, for example, from a resin molded body, and is wrapped around the outer circumferential portion of the folded air bag body 16. A fragile portion 62A, which can be easily broken at the time of expansion of the air bag body, is formed in this annular member 62. At the time of expansion of the air bag body, the fragile portion 62A is easily broken, and an extending portion 62B of the annular member 62 extends towards the vehicle interior and, as shown by the double-dashed line in FIG. 15, closes the gap between the guiding and holding member 42 and the upper end portion 49A of the garnish 49.

In the present embodiment, at the time of expansion of the air bag body, the inflation force from the air bag body 16 is applied to the annular member 62, and the fragile portion 62A of the annular member 62 is easily broken. As a result, the extending portion 62B of the annular member 62 extends towards the vehicle interior and, as shown by the double-dashed line in FIG. 15, closes the gap between the guiding and holding member 42 and the upper end portion 49A of the garnish 49. Further, in the present embodiment, since the annular member 62 for maintaining the folded shape of the air bag body is used as the air bag body expanding direction regulating member, it is thereby possible to reduce the number of components. Moreover, for the same reason as described above, the apparatus of the present invention can be made compact, and storability can be improved.

The annular member 62 can be structured in such a manner that a portion of the air bag body 16 is wrapped with a material such as a textile, non-textile, paper, or film material. In this case, a seal portion of the material which wraps the air bag body 16 can be used as a breaking portion. Or a slit or the like can be formed as a breaking portion in the annular member 62, separately.

As described above, while this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. A structure for the placement of a head protecting air bag apparatus in a vehicle, the apparatus being connected to an inflator that is configured to expand an air bag to extend the air bag over to a center pillar of the vehicle, the structure including an air bag expanding direction regulating member having a base end portion that is coupled to a portion of a vehicle roof side member inner panel that is adjacent to an upper end portion of a garnish of the center pillar, at least a portion of said air bag expanding direction regulating member being located at a vehicle interior side of the air bag, the air bag expanding direction regulating member having an edge portion side, of which an extending portion thereof extends downwardly from a first position where a part of the extending portion is above the upper end portion of said center pillar garnish to a second position where the part of the extending portion is beneath the upper end portion of said center pillar garnish, at which the extending portion covers the upper end portion of said center pillar garnish at the time of expansion of said air bag.

2. A structure for the placement of a head protecting air bag apparatus according to claim 1, wherein said air bag expanding direction regulating member is a plate having a cross section that is formed in a substantial U shape, a portion of said plate extends in accordance with the expansion of the air bag.

3. A structure for the placement of a head protecting air bag apparatus according to claim 1, wherein said air bag expanding direction regulating member is a cloth belt.

4. A structure for the placement of a head protecting air bag apparatus according to claim 1, wherein said air bag expanding direction regulating member is an annular member which is configured to break at the time of expansion of said air bag.

5. A structure for the placement of a head protecting air bag apparatus according to claim 1, wherein the inflator is positioned at a front end portion of said air bag.

6. A structure for the placement of a head protecting air bag apparatus according to claim 1, wherein said air bag expanding direction regulating member includes at least one mounting flange portion that is fixed to the roof side member inner panel.

7. A structure for the placement of a head protecting air bag apparatus according to claim 1, wherein a guiding and holding member, which fixes the base end portion of said air bag expanding direction regulating member thereto and guides the direction in which said air bag expands, is a bending member that has a storing portion which surrounds a portion of said air bag.

8. A structure for the placement of a head protecting air bag apparatus according to claim 1, wherein said air bag expanding direction regulating member is coupled to a portion of a vehicle roof inner panel via a bending member having a storing portion.

9. A structure for the placement of a head protecting air bag apparatus according to claim 1, wherein the air bag expanding direction regulating member comprises a loop-shaped cloth belt configured to be broken at the time of expansion of said air bag.

10. A structure for the placement of a head protecting air bag apparatus according to claim 4, wherein said annular member is a member that is configured to maintain a folded shape of said air bag.

11. A structure for the placement of a head protecting air bag apparatus according to claim 4, wherein a portion of said air bag is wrapped by said annular member.

12. A structure for the placement of a head protecting air bag apparatus according to claim 7, wherein said guiding and holding member is coupled to an end portion of a portion of said air bag that is substantially central in a vehicle longitudinal direction.

13. A structure for the placement of a head protecting air bag apparatus according to claim 7, wherein said guiding and holding member is coupled to the roof side member inner panel.

14. A structure for the placement of a head protecting air bag apparatus according to claim 8, wherein the base end portion of said air bag expanding direction regulating member is connected to a bottom wall portion of the bending member.

15. A structure for the placement of a head protecting air bag apparatus in a vehicle, one end portion of the apparatus being configured to be connected to an inflator, an air bag being configured to expand to extend over to a center pillar of the vehicle, wherein an air bag expanding direction regulating member having a base end portion that is coupled to a portion of a vehicle roof side member inner panel that is adjacent to an upper end portion of a center pillar garnish, the base end being located at a vehicle interior side of said air bag, the air bag expanding direction regulating member having an edge portion side, of which an extending portion thereof extends downwardly from a first position where a part of the extending portion is above the upper end portion of said center pillar garnish to a second position where the part of the extending portion is beneath the upper end portion of said center pillar garnish, at which the extending portion covers the upper end portion of said center pillar garnish at the time of expansion of said air bag, and wherein the air bag expanding direction regulating member is a plate having a cross-section formed in a substantial U-shape, and the air bag expanding direction regulating member, comprises at least one of:

a plurality of parallel concave grooves formed in an inner wall surface of said plate and running along the vehicle longitudinal direction; and at least one oblique concave groove which, when the plate extends, is directed from an inflator-side end portion of the plate toward a vehicle longitidinal direction intermediate portion of a side opposite the fixed side of the center pillar garnish, being formed in said plate.

16. A structure for the placement of a head protecting air bag apparatus in a vehicle, an air bag being configured to have one end portion connected to an inflator and configured to expand so as to extend over to a center pillar of the vehicle, wherein an air bag expanding direction regulating member having a base end portion that is coupled to a portion of a vehicle roof side member inner panel that is adjacent to an upper end portion of a garnish of the center pillar is located at a vehicle interior side of said air bag, wherein the air bag expanding direction regulating member includes an edge portion side, an extending portion thereof extends downwardly from a first position where a part of the extending portion is above the upper end portion of said center pillar garnish to a second position where the part of the extending portion is beneath the upper end portion of said center pillar garnish, at which the extending portion covers the upper end portion of the center pillar garnish at the time of expansion of said air bag, and wherein the air bag expanding direction regulating member is a resin plate which is formed from an extrusion molding product having a substantially U-shaped cross section and which is made from soft resin.

17. A structure for the placement of a head protecting air bag apparatus according to claim 16, wherein said resin plate has a plurality of hollow portions at the base end portion which extend from a vehicle interior side to a vehicle exterior side.

18. A structure for the placement of a head protecting air bag apparatus according to claim 16, wherein a portion of said resin plate extends in accordance with the expansion of said air bag.

19. A structure for the placement of a head protecting air bag apparatus according to claim 16, wherein a tip end portion of said resin plate has a protrusion which is configured to push a ceiling portion interior member in accordance with the expansion of said air bag.

20. A structure for the placement of a head protecting air bag apparatus according to claim 17, wherein a tip end portion of said resin plate has a protrusion which is configured to push a ceiling portion interior member in accordance with the expansion of said air bag.

21. A structure for the placement of a head protecting air bag apparatus in a vehicle, the apparatus being connected to an inflator that is configured to expand an air bag to extend the air bag over to a center pillar of the vehicle, the structure including:
an air bag expanding direction regulating member whose one end portion is coupled to a member of the vehicle which member is adjacent to an upper end portion of a garnish of the center pillar, at least a portion of said air bag expanding direction regulating member being located at a vehicle interior side of the folded air bag,
wherein an extending portion, which is a portion of said air bag expanding direction regulating member located at another end portion of said air bag expanding direction regulating member and which extends at the time of expansion of the air bag, extends downwardly from a first position where the extending portion is above the upper end portion of said center pillar garnish to a second position where the extending portion is beneath the upper end portion of said center pillar garnish, such that said extending portion covers the upper end portion of a garnish of the center pillar at the time of expansion of the air bag.

22. The structure according to claim 21, wherein said air bag expanding direction regulating member is disposed such that at least a portion of the folded air bag is surrounded by said air bag expanding direction regulating member.

23. The structure according to claim 21, wherein said extending portion is extended due to an expansion force of said air bag.

24. The structure according to claim 21, further comprising:
a guiding and holding member which is fixed to a roof side member inner panel of the vehicle, holds the folded air bag, and guides an expanding direction of the air bag at the time of expansion of the air bag,
wherein the one end portion of said air bag expanding direction regulating member is coupled to the roof side member inner panel via said guiding and holding member.

25. The structure according to claim 21, wherein the one end portion of said air bag expanding direction regulating member is fixed to a roof side member inner panel of the vehicle.

26. The structure according to claim 25, wherein said air bag expanding direction regulating member holds the folded air bag, and guides an expanding direction of the air bag at the time of expansion of the air bag.

27. A structure for the placement of a head protecting air bag apparatus in a vehicle, the apparatus being connected to an inflator that is configured to expand an air bag to extend the air bag over to a center pillar of the vehicle, the structure including:
an air bag expanding direction regulating member,
which is coupled to a member of the vehicle which member is adjacent to an upper end portion of a garnish of the center pillar,
which is an annular shape surrounding the folded air bag, and
which includes a breakable portion which breaks at the time of expansion of the air bag,
wherein said air bag expanding direction regulating member extends downwardly at the time of expansion of the air bag from a first position where a part of the extending portion is above the upper end portion of said center pillar garnish to a second position where the part of the extending portion is beneath the upper end portion of said center pillar garnish, such that a portion of said air bag expanding direction regulating member covers the upper end portion of a garnish of the center pillar by the breakable portion being broken at the time of expansion of the air bag.

28. The structure according to claim 21, wherein said air bag expanding direction regulating member comprises a rigid portion which holds the folded air bag, guides an expanding direction of the air bag at the time of expansion of the air bag, and is substantially L-letter shaped cross section,
wherein the one end portion of said air bag expanding direction regulating member, which is an one end portion of said rigid portion, is fixed to a roof side member inner panel of the vehicle, and said extending portion is coupled to another end portion of said rigid portion.

* * * * *